(12) United States Patent
Burke

(10) Patent No.: US 8,784,072 B2
(45) Date of Patent: Jul. 22, 2014

(54) COMPRESSION APPARATUS WITH VARIABLE SPEED SCREW AND METHOD

(75) Inventor: Murray J. Burke, Oakville (CA)

(73) Assignee: Mascoma Canada Inc., Mississauga (CA)

( * ) Notice: Subject to any disclaimer, the term of this patent is extended or adjusted under 35 U.S.C. 154(b) by 692 days.

(21) Appl. No.: 12/918,051

(22) PCT Filed: Jul. 16, 2010

(86) PCT No.: PCT/CA2010/001109
§ 371 (c)(1),
(2), (4) Date: Aug. 17, 2010

(87) PCT Pub. No.: WO2011/006253
PCT Pub. Date: Jan. 20, 2011

(65) Prior Publication Data
US 2011/0110810 A1     May 12, 2011

(30) Foreign Application Priority Data

Jul. 17, 2009  (CA) ..................................... 2672674
Jul. 16, 2010  (WO) ................ PCT/CA2010/001109

(51) Int. Cl.
*F04B 23/14*   (2006.01)
*F04B 23/08*   (2006.01)
*F04B 17/00*   (2006.01)
*F04B 35/00*   (2006.01)
*F04B 49/06*   (2006.01)

(52) U.S. Cl.
USPC ........... 417/203; 417/201; 417/205; 417/326; 417/44.2

(58) Field of Classification Search
USPC ................ 417/244, 201, 202, 203, 326, 44.2; 418/5; 100/117, 137
See application file for complete search history.

(56) References Cited

U.S. PATENT DOCUMENTS 797,374 A * 8/1905 Roberts ......................... 100/147
3,054,343 A * 9/1962 Pellett ........................... 100/148
(Continued)

FOREIGN PATENT DOCUMENTS

AU   2005100501 A4   7/2005
CA      2660990 A1   8/2009
(Continued)

OTHER PUBLICATIONS

Bourgeois, J.M., Circuits for Power Factor Correction with Regards to Mains Filtering, ST Microelectronics Application Note, AN 510/0894, 1999.
(Continued)

*Primary Examiner* — Charles Freay
*Assistant Examiner* — Alexander Comley
(74) *Attorney, Agent, or Firm* — Bereskin & Parr Ltd./S.E.N.C.R.L., s.r.l.; Kenneth Bousfield

(57) ABSTRACT

An apparatus is provided for compressing a loose solid feedstock. The apparatus includes a two stage compressor. The first compression stage is a screw compressor. The second compressor stage is a reciprocating compressor. The reciprocating compressor operates co-axially with, and receives its feed from, the screw compressor. A choke cone maintains pressure in the outfeed from the compressor stages. The reciprocating compressor, the screw compressor, and the choke cone are all adjustable in real time to control the compression of the feedstock according to a pre-programmed schedule that need not have equal compression and retraction strokes. The operation of the screw compressor may be advanced or eased off depending on the motion of the reciprocating compressor. The operation of the choke cone may be actively controlled to obtain a coordination with the compressor stages.

14 Claims, 23 Drawing Sheets

(56) References Cited

U.S. PATENT DOCUMENTS

| | | | | |
|---|---|---|---|---|
| 3,268,638 A | * | 8/1966 | Tann | 264/69 |
| 3,394,649 A | | 7/1968 | Kemper et al. | |
| 3,865,528 A | * | 2/1975 | Roess | 425/145 |
| 4,117,776 A | | 10/1978 | Hunt | |
| 4,119,025 A | * | 10/1978 | Brown | 100/35 |
| 4,186,658 A | * | 2/1980 | Brown | 100/148 |
| 4,211,163 A | * | 7/1980 | Brown et al. | 100/145 |
| 4,213,747 A | | 7/1980 | Friedrich | |
| 4,412,485 A | * | 11/1983 | Brown | 100/117 |
| 4,457,670 A | * | 7/1984 | Tomson et al. | 417/53 |
| 4,491,504 A | | 1/1985 | Engall | |
| 4,582,568 A | | 4/1986 | Iyengar | |
| 4,632,795 A | | 12/1986 | Huber et al. | |
| 4,700,622 A | * | 10/1987 | Satake | 100/45 |
| 4,842,162 A | * | 6/1989 | Merkel | 222/1 |
| 4,944,669 A | | 7/1990 | Zakich | |
| 4,947,743 A | * | 8/1990 | Brown et al. | 100/45 |
| 5,076,160 A | * | 12/1991 | de Almeida Thompson | 100/145 |
| 5,171,592 A | | 12/1992 | Holtzapple et al. | |
| 5,336,052 A | * | 8/1994 | Zollner et al. | 417/20 |
| 5,377,481 A | * | 1/1995 | Sibley et al. | 56/341 |
| 5,466,108 A | * | 11/1995 | Piroska | 414/218 |
| 5,473,061 A | | 12/1995 | Bredereck et al. | |
| 5,516,427 A | * | 5/1996 | Yoshikawa | 210/413 |
| 5,585,053 A | * | 12/1996 | Arai | 264/40.1 |
| 5,911,924 A | * | 6/1999 | Siegrist et al. | 264/40.1 |
| 5,960,711 A | * | 10/1999 | Nordin | 100/127 |
| 6,247,662 B1 | * | 6/2001 | Hamilton | 241/260.1 |
| 6,416,621 B1 | | 7/2002 | Karstens | |
| 6,615,710 B1 | | 9/2003 | Ishigaki et al. | |
| 6,875,385 B2 | * | 4/2005 | Hawley et al. | 264/136 |
| 7,335,311 B2 | | 2/2008 | Christophersson | |
| 7,390,118 B2 | | 6/2008 | MacDonald et al. | |
| 2006/0071614 A1 | | 4/2006 | Tripathi et al. | |
| 2007/0214971 A1 | | 9/2007 | Williams et al. | |
| 2008/0063869 A1 | | 3/2008 | Mortazavi | |
| 2009/0057938 A1 | * | 3/2009 | Zhang | 264/40.1 |
| 2009/0087510 A1 | * | 4/2009 | Hakoda et al. | 425/149 |

FOREIGN PATENT DOCUMENTS

| | | |
|---|---|---|
| CN | 20097046 Y | 11/2007 |
| CN | 201053902 Y | 4/2008 |
| CN | 102497924 | 6/2012 |
| CN | 102497975 | 6/2012 |
| CN | 102497977 | 6/2012 |
| CN | 102497974 | 7/2012 |
| DE | 3412158 | 10/1985 |
| FR | 2522585 A1 | 9/1983 |
| GB | 2131342 A | 6/1984 |
| GB | 2444387 A | 4/2008 |
| JP | 6233097 A | 8/1994 |
| WO | 00/07806 | 2/2000 |
| WO | 02096162 A1 | 11/2002 |
| WO | 2008112820 A3 | 9/2008 |
| WO | 2011006253 | 1/2011 |
| WO | 2011006254 | 1/2011 |
| WO | 2011006255 | 1/2011 |
| WO | 2011006256 | 1/2011 |

OTHER PUBLICATIONS

International Search Report dated May 28, 2010, corresponding to International Application No. PCT/CA2010/000110.

International Search Report and Written Opinion dated Oct. 12, 2010, for International Application No. PCT/CA2010/001111.

International Search Report and Written Opinion dated Oct. 29, 2010, for International Application No. PCT/CA2010/000110.

International Search Report and Written Opinion dated Oct. 13, 2010, for International Application No. PCT/CA2010/001112.

* cited by examiner

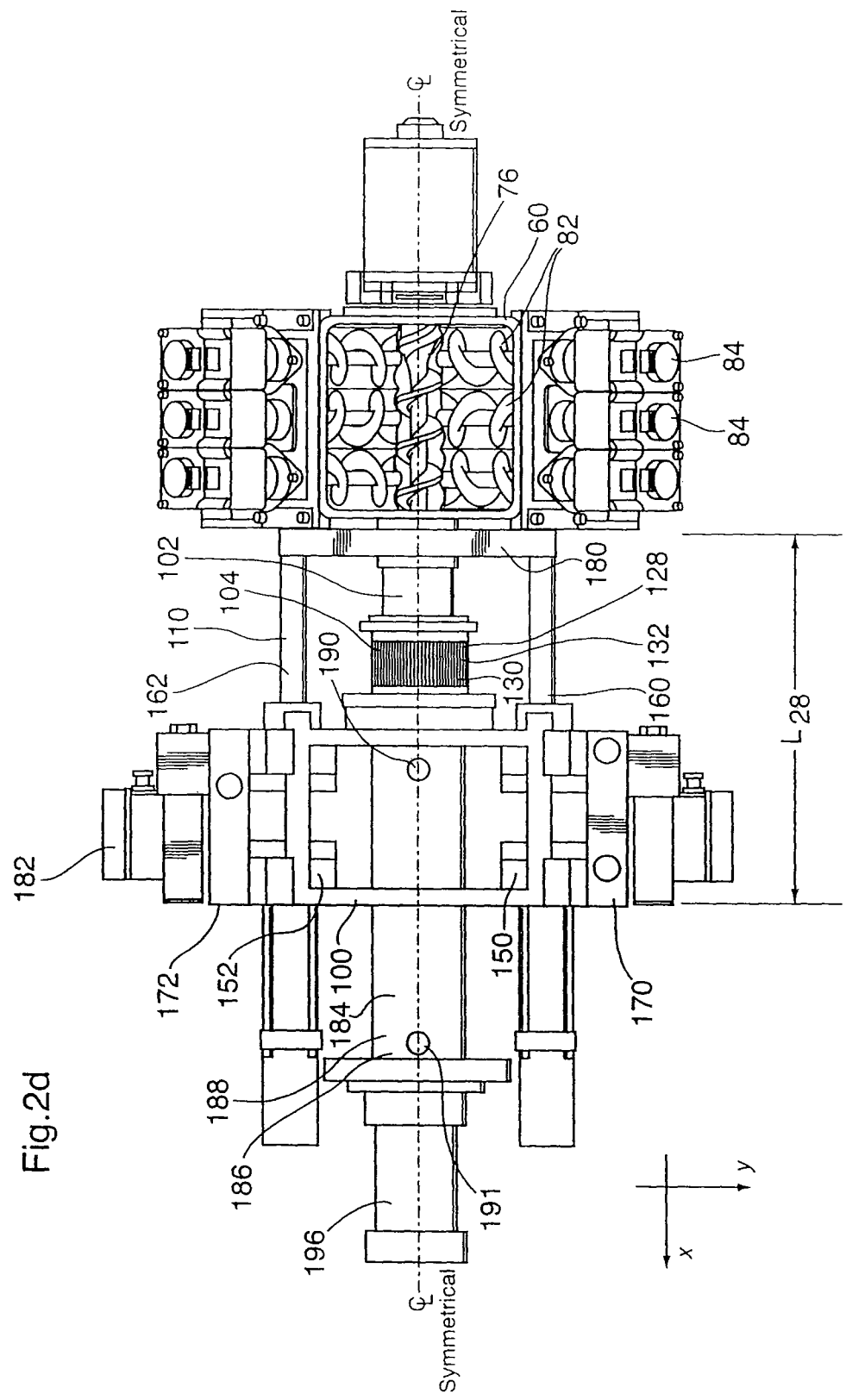

COMPRESSION APPARATUS WITH VARIABLE SPEED SCREW AND METHOD

CROSS REFERENCE TO RELATED APPLIATIONS

This application is a United States national phase filing of International Patent Application No. PCT/CA2010/001109, filed on Jul. 16, 2010, which claims the priority benefit from the Canadian Patent Application No. 2,672,674.

FIELD OF THE INVENTION

This invention relates to the field of apparatus for compressing loose materials, which may be loose fibrous materials, for introduction as a feedstock in a process occurring at elevated pressures.

BACKGROUND OF THE INVENTION

A number of industrial processes involve the introduction of a loose solid feedstock into a pressurized reaction chamber or vessel. Unless the process is limited to batch operation this may require that the feedstock be pressurized and forced into the reaction vessel while the reaction vessel is maintained at elevated pressure, and possibly also while maintained at elevated temperature. In a continuous process with a pure liquid or a compact solid this may be relatively straightforward. Even for a slurry, or for two-phased flow where solids are suspended in a carrier fluid, this may be possible without undue difficulty.

However, the compaction and pressurization of a rather porous, substantially dry solid, which may have the form of chips or flakes, or strands, may present a challenge. For example, these flakes or chips may be ligneous by-products of a forestry or agricultural activity. Earlier attempts to address this challenge are shown and described, for example, in U.S. Pat. No. 4,119,025 of Brown, issued Oct. 10, 1978; U.S. Pat. No. 4,947,743 of Brown et al., issued Aug. 14, 1990; and PCT Application PCT/CA99/00679 of Burke et al., published as WO 00/07806 published Feb. 17, 2000, the subject matter of all of these documents being incorporated herein by reference. At the end of the process, the loose, fibrous, typically organic material leaves the reaction chamber through a discharge assembly of some kind, whence it is collected for further use or processing. To the extent that the process feedstock is then to be used as an input to a subsequent process, such as a biological digestion process, it may be desirable that the fibrous material be finely expanded.

SUMMARY OF THE INVENTION

In an aspect of the invention there is a two stage compressor feed apparatus operable to compress loose feedstock material. The feed apparatus includes a first compressor stage and a second compressor stage. The first compressor stage includes a screw. The screw has a volute operable to drive the feedstock forward in an axial direction while compressing the feedstock. The second compressor stage has an axial accommodation permitting an end of the screw to extend therethrough. The first compressor stage has a drive connected to operate the screw. The drive is a variable speed drive. There are sensors mounted to monitor operation of the screw and the second compressor stage. There is a controller operable to receive signals from the sensors and to control operation of the screw. The controller is operable continuously to vary operating speed of the drive in response to operation of the second compressor stage.

In a feature of that aspect of the invention, the screw has a volute, and pitch between flights of the volute varies therealong. In a further feature, the pitch varies continuously along the screw, the pitch decreasing in spacing toward a distal tip of the screw. In another feature, the second compressor stage includes a piston, the piston is axially reciprocable relative to the screw. In still another feature, the first stage screw has a discharge tip, the discharge tip is surrounded by a sleeve, the sleeve is an axially stationary sleeve, the second stage piston surrounding the sleeve, and is axially reciprocable relative thereto, the sleeve has an interior face oriented toward the screw, and the interior face of the sleeve has axially extending reliefs defined therein. In yet another feature, the controller is programmed to monitor electrical motor current to the drive, and to maintain the electrical motor current below a maximum value during operation of the apparatus.

In still yet another feature, the second compressor stage has a duty cycle, the duty cycle includes a first portion and a second portion, and during the first portion of the second compressor stage duty cycle the controller is programmed to urge the screw to operate in a first speed regime, and in the second portion of the second compressor stage duty cycle the controller is programmed to operate the screw in a second, different speed regime. In a further additional feature, the first portion of the duty cycle is a piston advancing portion, and the second stage of the duty cycle is a piston retracting portion. In yet another feature, the controller is programmed to increase speed of the screw during the piston retracting portion of the duty cycle, and to decrease speed of the screw during the piston advancing portion of the duty cycle. In still yet a further feature, the screw has a proximal end mounted to the drive and a distal tip distant therefrom. The second compressor stage is a piston compressor stage has a piston mounted co-axially with the screw. A stationary sleeve is mounted co-axially about the distal tip of the screw, the sleeve has an internally axially grooved wall facing the screw. The piston is an annular piston mounted about the sleeve for axial reciprocation relative thereto. In a yet further still feature, the apparatus includes a de-watering zone, and the screw discharges through the piston into the de-watering zone.

In another aspect of the invention there is a two stage compression process for compressing loose feedstock material. That process includes providing a first compressor stage and a second compressor stage, the first compressor stage having a screw, the screw having a volute operable to drive the feedstock forward in an axial direction while compressing the feedstock. The second compressor stage has an axial accommodation permitting an end of the screw to extend therethrough. The first compressor stage has a drive connected to operate the screw. The drive is a variable speed drive. Sensors are mounted to monitor operation of the screw and the second compressor stage. A controller operable to receive signals from the sensors and to control operation of the screw is operated continuously to vary operating speed of the drive in response to operation of the second compressor stage.

In a feature of that aspect of the invention, the screw has a volute has wider pitch spacing at one end than the other, the process including progressively compressing the feedstock material with the volute as the screw turns. In another feature, the second compressor stage includes a piston, the piston is axially reciprocable relative to the screw, and the process includes adjusting operation of the screw while the piston is in operation. In another feature, the controller is programmed to monitor electrical motor current to the drive, and the process includes maintaining the electrical motor current below a maximum value during operation of the apparatus.

In a further feature, the second compressor stage has a duty cycle, the duty cycle includes a first portion and a second portion, and the process includes (a) during the first portion of the second compressor stage duty cycle the controller is programmed to urge the screw to operate in a first speed regime, and in the second portion of the second compressor stage duty cycle the controller is programmed to operate the screw in a second, different speed regime. In yet another feature the process includes at least one of (a) increasing speed of the screw during the piston retracting portion of the duty cycle, and (b) decreasing speed of the screw during the piston advancing portion of the duty cycle. In still yet another feature, the process includes delivering feedstock from either of the compressor stages to a de-watering section and draining liquid from the feedstock at the de-watering section. In still another feature, the process includes providing a pre-programmed schedule of operation for the second compression stage and conforming operation of the screw to the schedule.

These and other aspects and features of the invention may be understood with reference to the description and illustrations.

BRIEF DESCRIPTION OF THE ILLUSTRATIONS

The invention may be explained with the aid of the accompanying illustrations, in which:

FIG. 1b is a profile or side view of the process apparatus of FIG. 1a;

FIG. 1c is a top view of the process apparatus of FIG. 1a;

FIG. 1d is an end view of the process apparatus of FIG. 1a;

FIG. 2d is a top view of the assembly of FIG. 2a with superstructure removed and an alternate motion transducer arrangement;

FIG. 2e is an enlarged perspective detail of the screw drive of the first compressor stage of the compressor section assembly of FIG. 2a;

FIG. 3a shows a perspective view of the second compression stage of the compressor section assembly of FIG. 2a;

FIG. 3d is a perspective view of a feed piston drive transmission assembly of the second compressor stage of the compressor section assembly of FIG. 2a;

FIG. 3e shows a perspective view of the moving components of the second compression stage section of FIG. 3a;

FIG. 3g shows a perspective view of a frame member of the second compression stage of FIG. 3a;

FIG. 4b shows an enlarged side view of the section of FIG. 4a;

FIG. 6 is a side view in section on a vertical plane passing along the compressor section central plane of an alternate embodiment of compressor section to that of the apparatus of FIG. 1a.

DETAILED DESCRIPTION

Figure 1A:
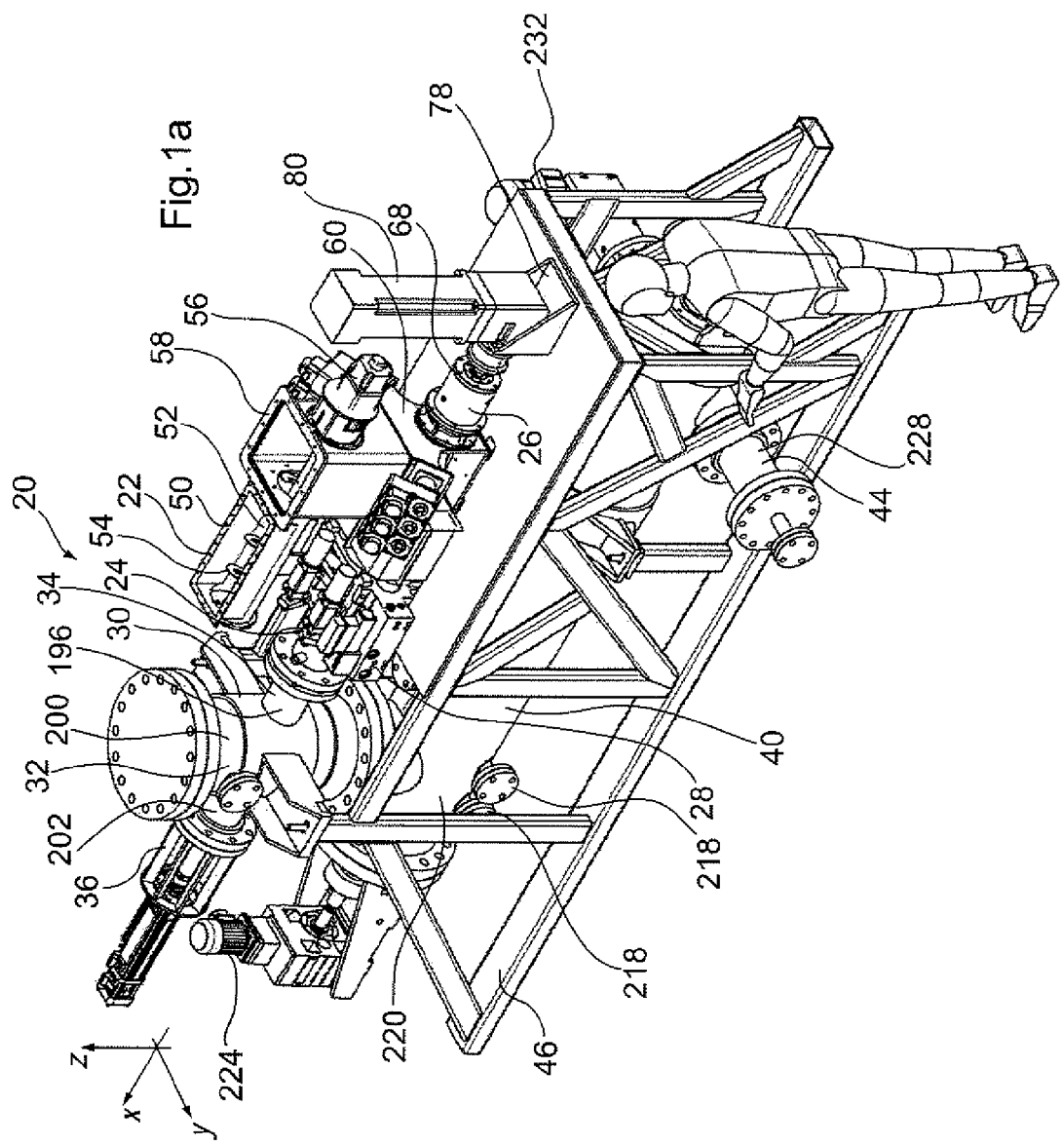
FIG. 1a is a general arrangement in perspective of a high pressure process apparatus having a feed compressor assembly according to an aspect of the present invention.
Figure 1B:
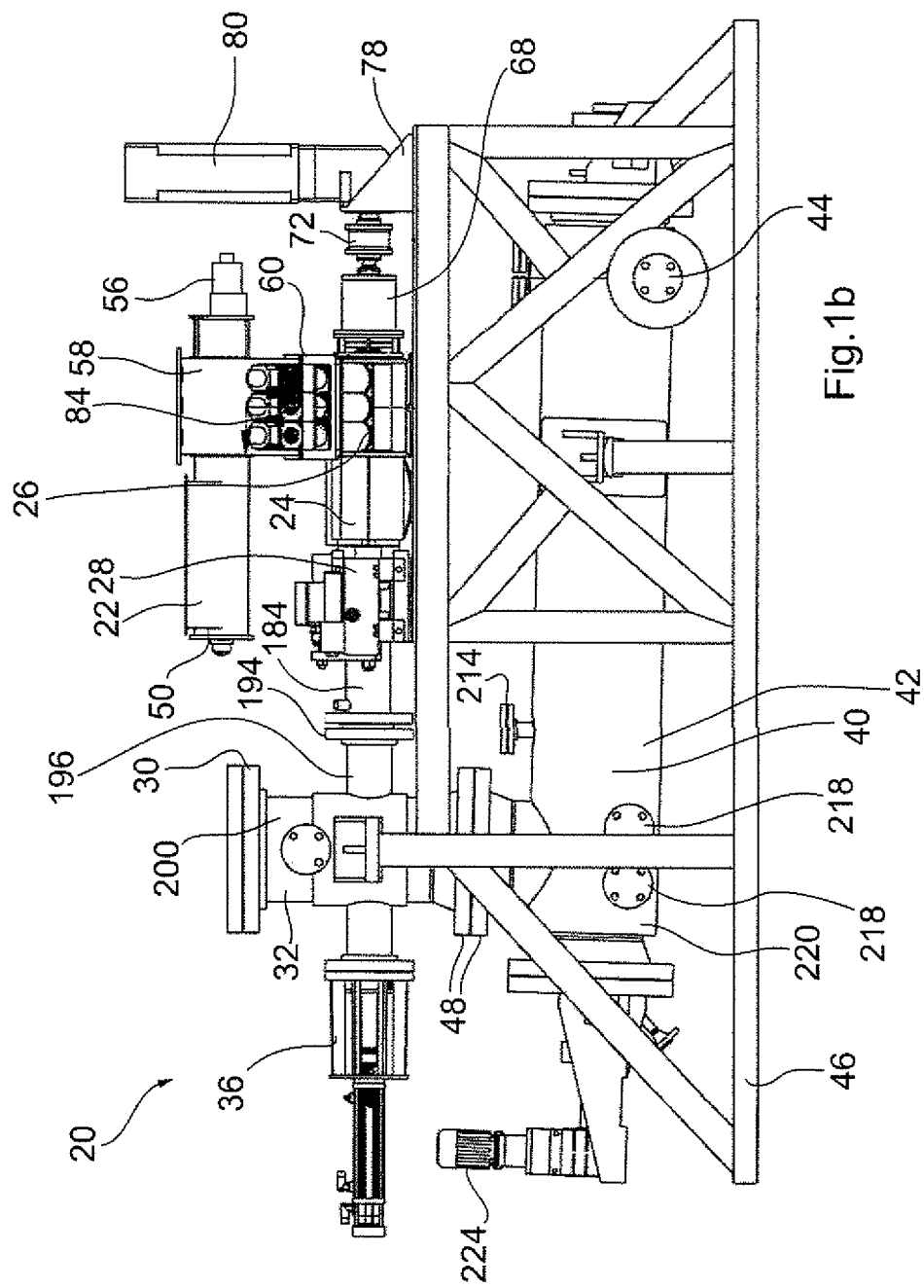
Figure 1C:
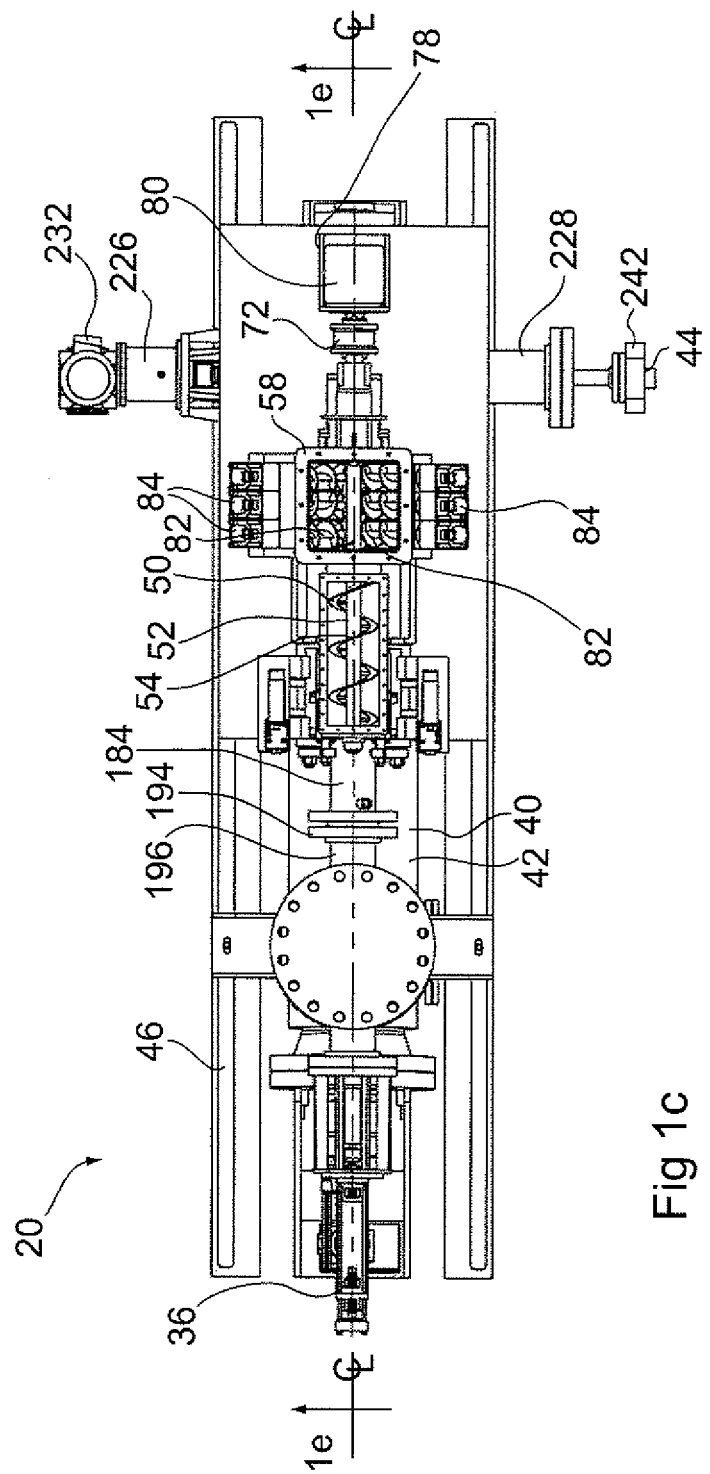
Figure 1D:
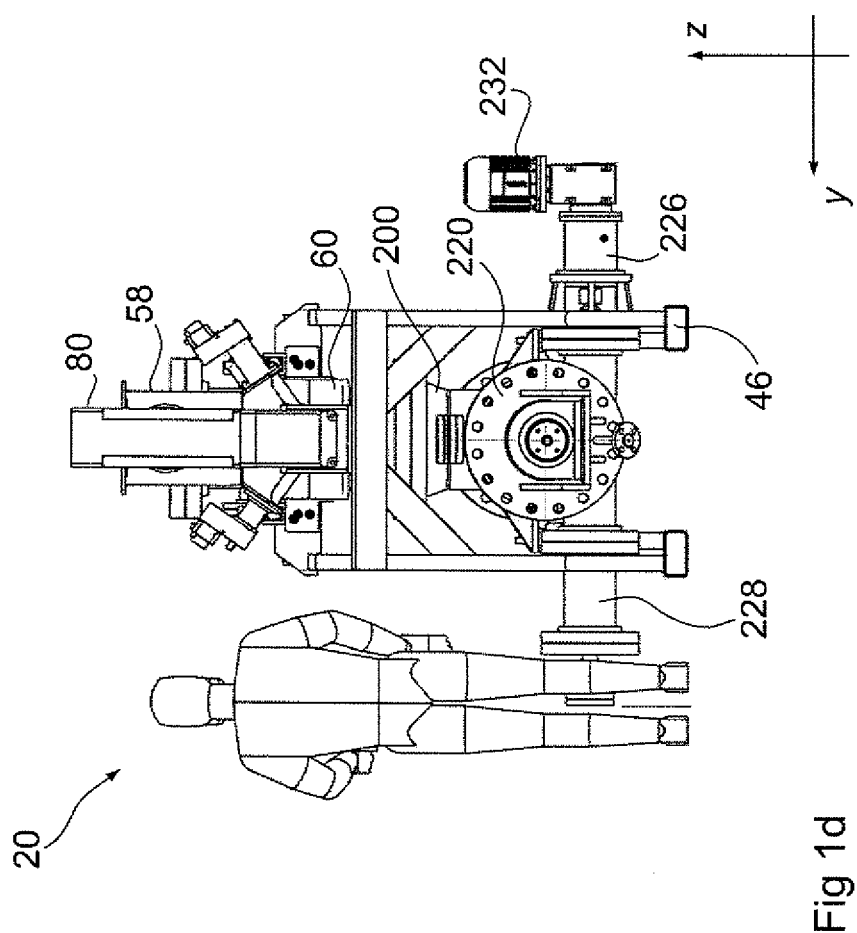

The description that follows, and the embodiments described therein, are provided by way of illustration of an example, or examples, of particular embodiments of the principles of the present invention. These examples are provided for the purposes of explanation, and not of limitation, of those principles and of the invention. In the description, like parts are marked throughout the specification and the drawings with the same respective reference numerals.

The terminology used in this specification is thought to be consistent with the customary and ordinary meanings of those terms as they would be understood by a person of ordinary skill in the art in North America. Following from the decision of the Court of Appeal for the Federal Circuit in *Phillips* v. *AWH Corp.*, and while not excluding interpretations based on other sources that are generally consistent with the customary and ordinary meanings of terms or with this specification, or both, on the basis of other references, the Applicant expressly excludes all interpretations that are inconsistent with this specification, and, in particular, expressly excludes any interpretation of the claims or the language used in this specification such as may be made in the USPTO, or in any other Patent Office, unless supported by this specification or in objective evidence of record in accordance with *In re Lee*, such as may demonstrate how the terms are used and understood by persons of ordinary skill in the art, or by way of expert evidence of a person or persons of experience in the art.

In terms of general orientation and directional nomenclature, two types of frames of reference may be employed. First, inasmuch as this description refers to screws, screw conveyors or a screw compressors, it may be helpful to define an axial or x-direction, that direction being the direction of advance of work piece material along the screw when turning, there being also a radial direction and a circumferential direction. Second, in other circumstances it may be appropriate to consider a Cartesian frame of reference. In this document, unless stated otherwise, the x-direction is the direction of advance of the work piece or feedstock through the machine, and may typically be taken as the longitudinal centerline of the various feedstock flow conduits. The y-direction is taken as a horizontal axis perpendicular to the x-axis. The z-direction is generally the vertical axis. In general, and unless noted otherwise, the drawings may be taken as being generally in proportion and to scale.

Apparatus 20—General Overview

A process apparatus 20 is shown in general arrangement in FIGS. 1a, 1b, 1c, 1d and 1e. In the direction of flow of the feedstock material, there is a first assembly 22 that may be an input feeder or infeed conveyor at which feedstock material is introduced. For the purposes of this discussion, the feedstock may be taken as being corn stalks, or sugar cane stalks, cane bagasse or bamboo, or wood chips, or bark, or sawdust, and so on. The feedstock may be fibrous, may be anisotropic, and may by hydrophilic to a greater or lesser extent such as in the example of wood chips or wood flakes derived from the processing of green wood. The feedstock may have an initial moisture content of between 10% and about 65% to 70% by weight, and may typically be processed with an initial moisture content in the range of 35 to 55% by weight.

Input feeder or input, or input conveyor 22 is attached to, and conveys feedstock material to, a multi-stage feedstock compression apparatus 24, which may be a co-axial feeder, that includes a first stage of compression indicated generally as 26, which may be a compression zone, such as a first stage compression zone or compression screw assembly, and a second stage of compression indicated generally as 28, which may be a second compression stage zone or piston zone assembly. Output from the piston zone, i.e., the second stage of compression 28, is fed through a discharge section to a reaction vessel in-feed assembly, indicated generally as 30. Assembly 30 includes a substantially vertically oriented digester drop chute or in-feed head chamber 32, an in-feed conduit or duct or insert, or digester insert 34; and a choke cone assembly 36. In-feed head chamber 32 is in essence part of the larger reactor, or reaction chamber or vessel 40, which may be referred to as a digester, and which includes not only head chamber or digester drop chute 32 but also a substantially horizontally, longitudinally oriented vessel, which may be termed the main reactor vessel or digester, 42. Main reactor vessel 42 may have an out feed or output assembly, which may also be called the discharge tube, 44. The entire apparatus may be mounted on a base or frame, indicated generally as 46. The reactor vessel may sometimes be termed a digester, and in other circumstances may be termed a hydrolyzer. In-feed assembly 30 is connected to main reactor vessel, or digester, 42 at a flanged coupling, indicated as 48. While only a single main reactor vessel is shown, other intermediate processing steps and their associate reactor vessels could also exist, and could be placed between in-feed assembly 30 and reactor vessel 42, connected at suitable flanged couplings such as coupling 48, as may be.

In one such process an organic feedstock in the nature of a loose lignocellulosic or partially lignocellulosic i.e., wood-based or wood-like feedstock is pressurized to perhaps 245 psig, and heated in the reaction chamber to saturated temperature of partially liquid water and partially water in vapour form. Moisture may be added or extracted, as may chemical solutions. The feedstock is held at this pressure and temperature for a period of time as it advances along the reaction chamber. At the discharge apparatus there is a more or less instantaneous, substantially adiabatic, and substantially isentropic expansion. The almost instant reduction in pressure may tend to result in the water trapped in the moisture absorbent wood chips or flakes tending to want to undergo a change of state from liquid to vapour almost instantaneously, with a resultant expansion within the feedstock that is perhaps not entirely unlike steam expansion in the making of popcorn. The result is that the fibres of the feedstock tend to be forced apart and in some sense beaten, making a finer, looser product. The product so obtained may have a relatively high ratio of surface area to volume, and may be "tenderized" in a sense, such that the fibres may more easily be broken down in digestive processes of micro-organisms, e.g., bacteria, fungi, viruses, and so on, by which those fibres may be more readily converted to other chemicals, such as ethanol.

Input Feeder or Infeed Conveyor 22

Input feeder or infeed conveyor 22 may include a collector vessel, which may be termed a reservoir, a trough, or an infeed screw hopper 50. It includes a feed advancement apparatus, or feeder, or infeed conveyor 52, which may be a conveyor, whether a belt conveyor or screw conveyor or auger 54 as shown. A drive, namely infeed conveyor drive 56 is provided to run auger 54, drive 56 being mounted on the far side of a down feed housing or drop chute 58, with the drive shaft extending in the horizontal longitudinal direction through the housing to auger 54. Drop chute 58 is mounted atop, and in flow communication with, an input housing, or feeder hopper, 60 of compressor apparatus, or co-axial feeder, 24.

First Stage Compressor or Compression Screw 26

Compression apparatus or co axial feeder 24 is mounted to a base plate 62, which is mounted to frame 46. First stage compressor or compression screw zone 26 includes a moving compression member, 64, a stationary compressed feedstock retaining member 66, input housing or feeder hopper 60, a bearing housing or bearing housing assembly 68 (and, inherently, the bearing contained therein), a drive identified as a compression screw reducer 70, and a drive coupling 72, and an array of preliminary infeed feed-stock conveyor members such as may be identified as triple screw assemblies 74.

Moving compression member 64 may be a compression screw 76. Compression screw 76 may include a volute having a variable pitch spacing between the individual flights or turns of the volute, either as a step function or, as in the embodiment illustrated, have a continuously decreasing pitch spacing as the tip of the screw is approached in the distal, forward longitudinal or x-direction. Compression screw 76 has a longitudinal centerline, and, in operation, rotation of screw 76 causes both forward advance of the feedstock material along the screw, and, in addition, causes compression of the feedstock in the longitudinal direction. The base or proximal end of screw 76 is mounted in a bearing, or compression screw bearing housing assembly 68 having a flange that is mounted to a rearwardly facing flange of input housing such as may be termed a feeder hopper 60. The keyed input shaft of screw 76 is driven by the similarly keyed output shaft of drive or reducer 70, torque being passed between the shafts by coupling 72.

Compression screw drive 70 includes a compression screw drive motor 80 mounted on its own motor base 78, which is mounted to base plate 62. Motor 80 may be a geared motor, and may include a reduction gearbox. Motor 80 may be a variable speed motor, and may include speed sensing, monitoring, and control apparatus operable continuously to vary output speed during operation.

Feedstock entering drop chute 58 is urged by gravity into input housing 60, and generally toward compression screw 76. To aid in this migration, feed-stock conveyor members 74 may be used to direct the feed-stock to compression screw 76. Members 74 may have the form of two generally opposed, inclined banks of twin screws or triple screws or augers 82, mounted generally cross-wise to screw 76. Screws 82 are driven by motors 84 mounted to input housing 60. Screws 82, of which there may be four, six or eight, for example, may be in a V-arrangement.

Stationary compressed feedstock retaining member 66 may have the form of a compression screw sleeve 90 that is positioned about compression screw 76. In the embodiment illustrated compression screw sleeve 90 is both cylindrical and concentric with compression screw 76. Sleeve 90 has a radially extending flange at its upstream end, by which it is bolted to the downstream side face of input housing 60. Sleeve 90 may have an inner surface 92 that has a set of longitudinally extending grooves or channels defined therein, such as may be termed compression screw sleeve flutes 94. Flutes 94 may run parallel to the axial centerline of sleeve 90. As compression screw 76 operates, sleeve 90 provides radial containment of the feedstock as it is progressively compressed in the first stage of compression, and defines a portion of the flow passageway or conduit along which the feedstock is compelled to move. Sleeve 90 also has an outer surface, 96 that is cylindrical, and that interacts in a mating close sliding piston-and-cylinder-wall relationship with the second stage compressor. Outer surface 96 may be concentric with inner surface 92 and the axial centerline of sleeve 90 generally.

Second Stage Compressor or Piston Zone 28

The second stage of compression, or second stage compressor 28 includes a frame, or stator, or housing, or spider, indicated generally as 100; a moving compression member or piston 102; a feedstock retainer 104 that co-operates with moving compression member 102; and a motive drive and transmission assembly 110, which may also be referred to as a ram drive assembly.

Figure 3A:
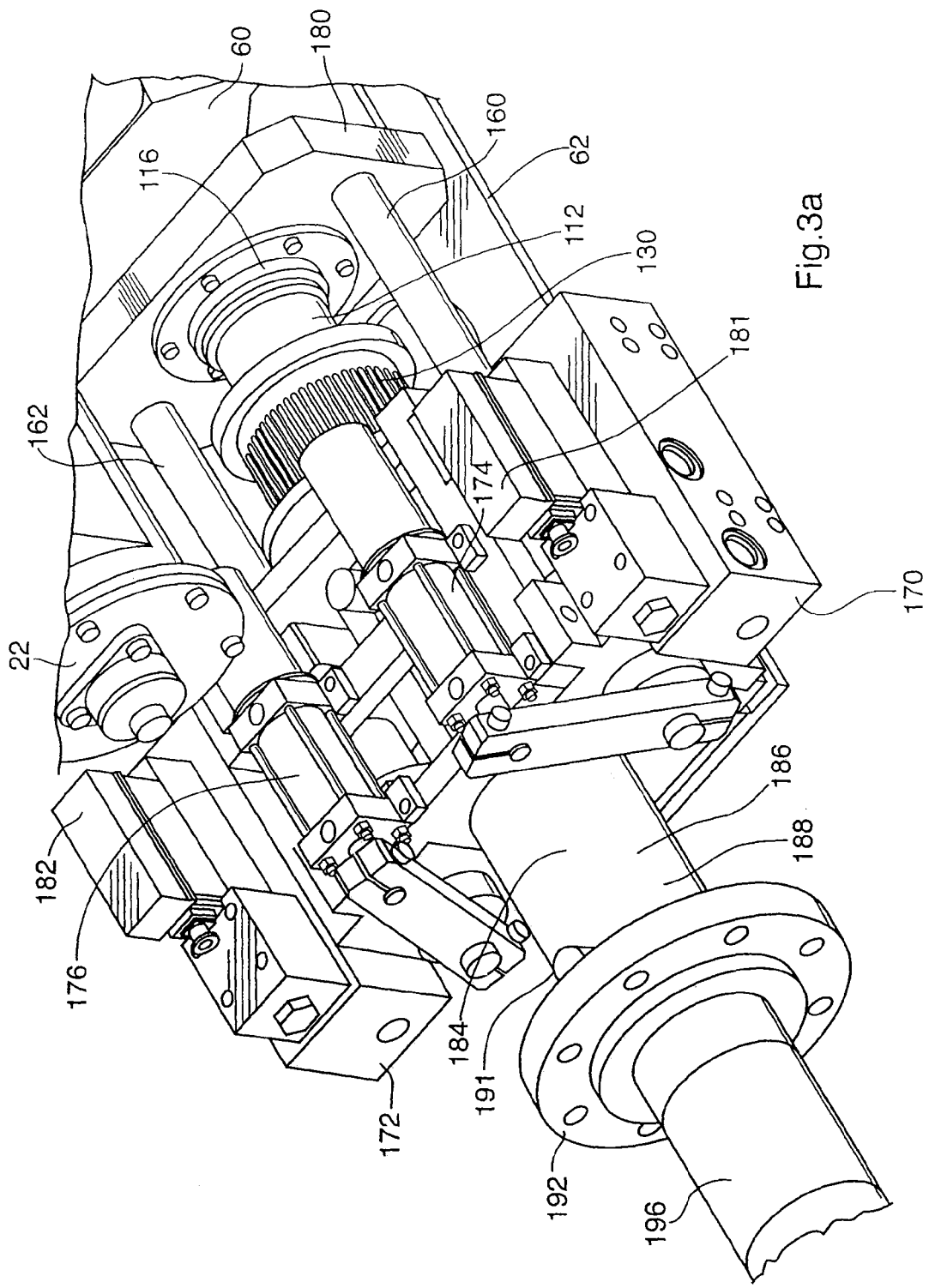
Figure 3B:
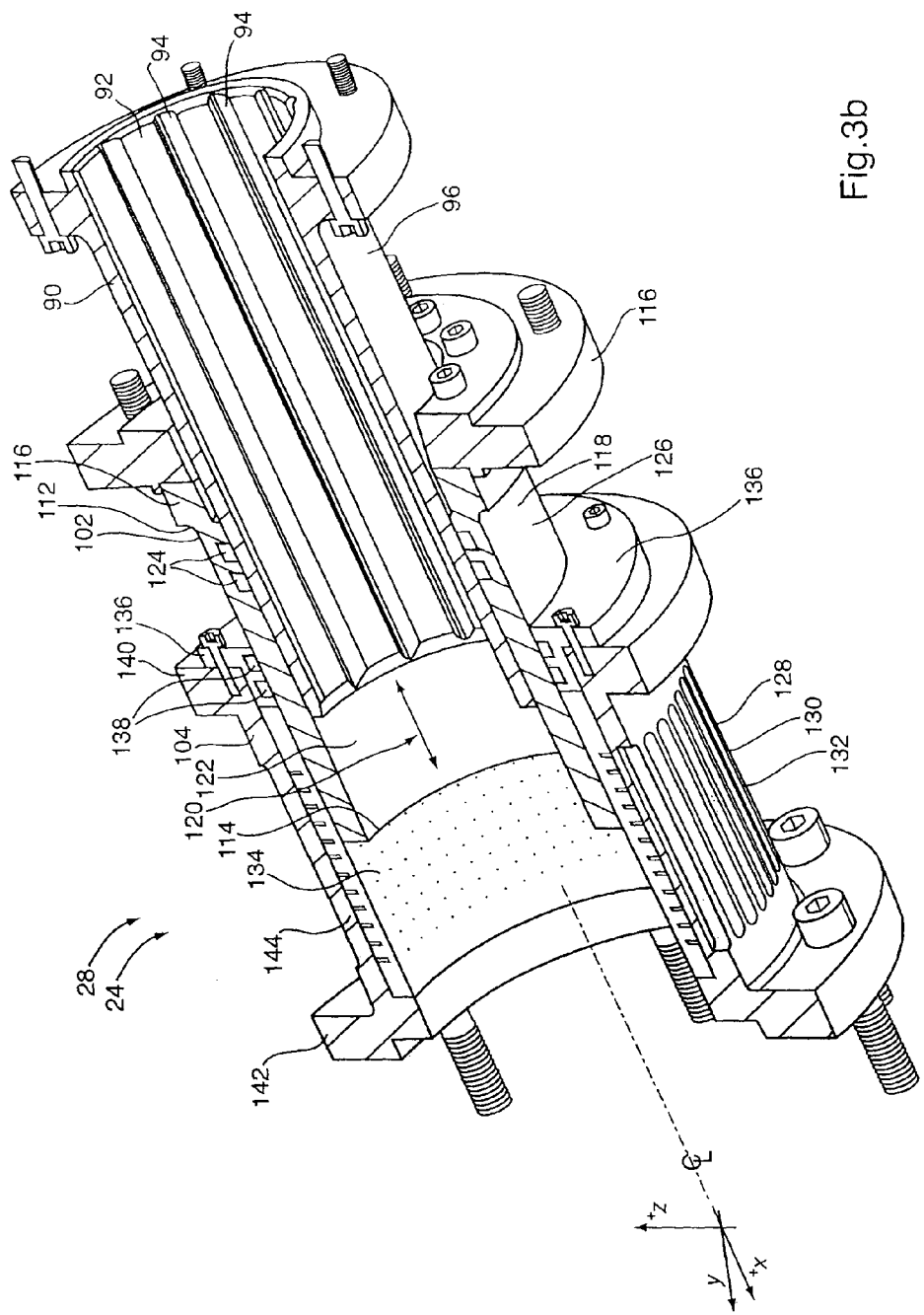
FIG. 3b shows a perspective sectional view of a portion of the compressor assembly of FIG. 2a from the first stage screw compressor sleeve to the end of a dewatering section.

The frame, or housing or spider 100 (FIG. 3g) is rigidly mounted to base plate 62, and hence to frame 46. It provides the datum or stationary point of reference for the second stage of compression, and links the major components of the second stage of compressions together. It has forward and rearward transverse frames, or wall members, or bulkheads, or plates indicated as 105, 106, and upper and lower longitudinally extending webs or walls, both left and right hand being indicated as members 107, 108. Walls 107, 108 terminate at flanges 109. Each of the transverse plates 105, 106 has a central eyelet, or relief, or aperture 101 formed there through to accommodate the duct or conduit, or cylinder in which feedstock is compressed and urged toward the reactor chamber. These eyelets are axially spaced apart, and concentric. This establishes the spatial relationship of that stationary conduit. Flanges 109 provide mounting points for the hydraulic rams and servo motors that drive and control compression member 102, thus establishing the fixed spatial relationship between the cylinder rods, the base, and the stationary conduit.

Moving compression member 102 (FIG. 3b) may be a reciprocating piston 112 having a first end 114, which may be a piston front face, and a second end 116, which may be a piston flange face. First end 114 is the downstream end that faces in the direction of compression and in the direction of motion of the feedstock and defines the output force transfer interface of second stage compressor 28 in general, and of moving compression member 102 in particular. First end 114 is an abutment end and is the head or face of the piston. First end or piston face 114 will be understood to include any wear plate or surface that may be formed thereon or attached thereto. A cylindrical piston wall or coating or skirt, or piston outside surface 118 extends rearwardly from first end 114 to second end 116.

Compressor piston 112 has a passageway 120 formed there through to permit feedstock from the first compressor stage to pass into the second compressor stage. Piston 112 has an inner surface 122 that permits reciprocation of piston 112 relative to screw 76 and sleeve 90. It is convenient that surface 122 be a round cylindrical surface that is concentric with outer surface 96 (the compression screw sleeve outside diameter), and the centerline axis of sleeve 90. First and second axially spaced apart seals, or rings 124 are mounted in seal ring grooves formed in skirt 118 near to second end 116. In operation rings 124, which may be the compression screw sleeve seals, provide a sliding seal between sleeve 90 and piston 112. Piston 112 also has an outer surface 126. It is convenient that outer surface 126, which may be the piston outside diameter, be a round cylindrical surface, and that this surface be concentric with the other surfaces 122, 96 and 92, although it need not necessarily be either round or concentric.

Feedstock retainer or dewatering split sleeve assembly 104 defines the outer cylinder wall 128 with which annular piston 122 co-operates, and to the extent that piston 112 is a moving member, cylinder wall 128 may be considered to be a stator, or stationary member. Retainer 104 may define a de-watering section or dewatering zone 130. De-watering section 130 performs both the function of retaining the feedstock as it is compressed and the function of a sieve or colander that allows liquids and air to be drained off The term "de-watering" refers to squeezing liquid, or air, out of the feedstock during compression. While this liquid may be water, or predominantly water, it may be a juice or oil, or it may include removal of gases, such as air. The term "de-watering" is not intended to imply that the apparatus is limited only to use with water or water based liquids.

Dewatering section 130 may include a dewatering zone housing 132, also known as a dewatering split sleeve assembly, a porous sleeve 134, also known as a dewatering sleeve insert, a flange member or seal cover 136 and piston seals 138. Housing 132 may have an upstream flange 140, a downstream flange 142 for rigid e.g., bolted, connection to spider 100, and a longitudinally extending wall 144 that runs between flanges 140 and 142. Wall 144 may have an array of perforations, or slots or drains spaced circumferentially thereabout to admit the passage of liquid squeezed out of the feedstock. Porous sleeve 134 slides axially into housing 132, and is retained in place by flange member 136. Flange member 136 is fixed to flange 140, e.g., by bolts. Porous sleeve 134 conforms to outer surface 126 of piston 112. Porous sleeve 134 may include an array of fine capillaries, or perforations or perforation channels that permit the generally radial egress of liquid liberated from the feedstock during compression. Flange 136 includes grooves for the axially spaced O-ring seals 138 that bear in sliding relationship against the outer surface 126 of piston 112. Base plate 62 has a drain located beneath de-watering section 130.

Motive drive and transmission assembly 110 (FIG. 3d), which may also be termed a ram drive assembly, includes those members that produce the motion of piston 112 relative to the stationary base or point of reference, such as spider 100. They include a pair of first and second drive members, which may be identified as first and second actuator pistons 150, 152 that are each mounted between a pair of first and second axially spaced apart slide bearings 154, 156. Assembly 110 includes a plurality of transmission members, which may be identified in the illustrations as hydraulic cylinder rods, or simply "rods", identified as shafts 160, 162. If viewed in cross-section perpendicular to the line of action of piston 112 (also perpendicular to the respective lines of action of actuator pistons 150, 152), the array or arrangement or layout of the actuator pistons (in this instance two, 150, 152, but it could as easily be 3, 4, 5 or more), in which the line of action of compressor piston 112 (which is taken as lying at the centroid thereof along the centerline of the compressor section) is understood to be between, or intermediate, or nestled amidst, or lying in the center of the grouping of, the lines of action of the force input interface of the actuator pistons. In the case of actuator two pistons, (i.e., rather than three or more) while it is desirable that the lines of action of the actuator pistons and the line of action of the compressor piston be mutually coplanar, under some circumstances there may be a small degree of eccentricity where the line of action of the output piston, i.e., compressor piston 112 lies some distance out of the plane of centers of the input pistons. This eccentricity distance may be less than one half of the maximum outside radius of piston 112, and more desirably less than 1/10 of that radius length. The output piston may still be said to be generally amidst, or between, or intermediate the two input pistons when the centerlines of those pistons are eclipsed from one another by the diameter of the output piston.

There may be any number of such pistons 150, 152 and shafts 160, 162. Where there are more than two such pistons and shafts they may be arranged such that if the assembly is sectioned transversely, and each shaft is taken as a vertex of a polygon, the centerline of the compression stages will fall within the polygon such that force transmission is not eccentric. It may be, for example, that the centerline axis of the first and second compressor stages lies at the centroid of any such polygon. Where there are three such pistons, for example, they may be arranged on 120 degree angular spacing about the centerline. Where there are more than two pistons, the terms amidst, intermediate or amidst may be used whenever the line of action, or centroid, of the output piston lies within the polygon whose vertices are defined by the lines of action of the input pistons. The actuator pistons need not be precisely equally angularly spaced about the output piston, but may be spaced in a generally balanced arrangement.

Shafts 160, 162 may either be mounted to the rams of a respective piston, or, as illustrated, may pass directly through a piston, be it 150 or 152, and may have the piston head members against which the pressurized working fluid acts mounted thereto within the piston cylinder, 164, 166. In the usual manner, admission of fluid into one side of cylinder 164 (or 166) will drive shaft 160 (or 162) piston to the retracted or return position shown in FIG. 3g, while admission of fluid to the other end of cylinder 164 (or 166) will cause shaft 160 (or 162) to move in the other direction to compress the feedstock. Drive assembly 110 may have servo valves 170, 172 for this purpose. Pistons 150, 152 may be either pneumatic or hydraulic. In the embodiment illustrated, pistons 150, 152 may be understood to be hydraulic.

Assembly 110 may also include position or motion transducers, indicated as 174, 176 mounted either directly to shafts 160, 162 or to slave shaft members such as may permit the instantaneous position of shafts 160, 162 to be known, and their change in position per unit time, i.e., velocity, to be calculated. Shafts 160, 162 terminate, and are attached to, a cross-member, or frame, or yoke, a ram or ram plate, a crosshead or simply a head 180 (FIG. 3e). The connections of shafts 160, 162 may be slackless connections, and may be moment connections. That is the connections may be rigid such that there is no degree of freedom of motion between the end of shafts 160 and 162 with respect to either longitudinal displacement along the x axis or angular rotation about the y or z axes. The connections may be splined, may include a shoulder, and may be bolted. Head or piston ram 180 may have the form of a yoke or plate having a central opening to accommodate reciprocation of objects relative thereto through the central opening, such as the elements of the first compressor stage, notably sleeve 90 and screw 76. In this instance head 180 has an internal annular flange or shoulder to which second end 116 of piston 112 is bolted.

It may be that pistons 150, 152 have their own integral rams or shafts, to which shafts such as shafts 160, 162 may be mounted axially as extensions. Whether this is so, or whether shafts 160, 162 are monolithic members or members that are assembled from two or more sub-components, the use of axially spaced apart slide bearings constrains shafts 160, 162 to a single degree of freedom of motion, namely translation along the motion path defined by slide bearings 154, 156. That motion path may be straight line axial displacement.

In contrast to some earlier machines, apparatus 20 may be free of such things as a large flywheel, a rotating crankshaft, long and heavy connecting rod assemblies, and so on. Since it may be desirable to avoid unduly large live loads as piston 112 reciprocates, it may be that there are only two such shafts and pistons. In this example, the entire live load is made up of piston 112, head 180, in essence a flanged ring with lugs, and shafts 160, 162. Moreover, the placement of pistons 150, 152 to the same side of head 180 as piston 112 may tend to make for a relatively compact assembly in the longitudinal direction, that length being less than the combined length of sleeve 90 and de-watering section 130. The length of the transmission drive train so defined may be expressed as a ratio of the output inside diameter of de-watering section 130 or tailpipe, or hydrolyzer inlet insert 196, that ratio lying in the range of less than 8:1, and in one embodiment is about 5:1. Another potential measure of live load is the lateral compactness of the unit., as measured by the center spacing of the rods. In one embodiment the stroke of piston 112, signified as $dx_{112}$ may be about 3 inches, the bore may be about 4 inches, and the lateral spacing of the rods may be about 11 inches. The cantilever distance or overhang of the transmission is defined as the maximum length (i.e., in the retracted position) of the rods, shafts 160, 162 plus the ram plate, head 180, that extend beyond the nearest bearing. In one embodiment this may be about 10". Taking these values in proportion, in one embodiment the ratio of stroke to bore may be less than square (i.e., stroke/bore <1), and in some embodiments less than 4:5. The ratio of overhang to piston stroke may be in the range of 2.5:1 to 3.0:1. The ratio of overhang to lateral center to center distance of rods 160, 162 may be in the range of less than 1 and may be 15/16 or less. In one embodiment it may be about 5/8.

A ram driven by hydraulic cylinders was used in U.S. Pat. No. 4,119,025. However, as seen at FIG. 2 of that patent, quite aside from lack of feedback and positive control, there are at least two other points at which additional degrees of freedom of motion are introduced between the rigid frame of reference defined by the main conduit, and the output at the piston, those degrees of freedom being introduced by the pivot connection of the rams to the frame, and by the pivot and clevis pin arrangement between the rams and the slides. At each of these points slack, or tolerance build-up, can be introduced into the system. In the embodiment of apparatus 20 illustrated herein, the drive transmission is slackless from the point of application of input force by the pressurized working fluid at pistons 150, 152 to the interface between head 180 and second end 116 of piston 112, and, indeed to first end 114 of piston 112 at which output force is applied to, and work is done on, the feedstock. There are no intermediate points at which extraneous degrees of freedom are introduced into the system.

Further, inasmuch as it may be desirable to maintain the angular orientation of piston 112 relative to the centerline, it may also be desirable not to give rise to unnecessary or unnecessarily large eccentric or unbalanced loads. To that end, it may be that the centerline of piston 112 is either substantially co-planar therewith or lies fairly close to a plane defined by the axes of shafts 160, 162. "Fairly close to" in this context may be understood as being less than 1/10 of the outside diameter of piston 112, or less than one diameter of shaft 160, 162 away from being co-planar. Expressed alternatively in terms of angular arc, those pistons may lie in the range of 150 degrees to 210 degrees angular spacing, and may be about 180 degrees apart.

Drive assembly 110, or, more generally apparatus 20, may include a controller, indicated generically as 182 operable continually to monitor output from transducers 174, 176 and continually to adjust servo valves 170, 172 to control the position and rate of motion, be it advance or return, of piston 112. The clock rate of the controller microprocessor may be of the order of perhaps 1 GHz. The frequency of reciprocation of piston 112 may be of the order of 50 to perhaps as much as approaching 200 strokes per minute. A more normal cautious range might be from about 75-80 strokes per minute (1¼ to 1⅓ Hz) to about 150 strokes/min (2½ Hz), with a typical desirable speed of perhaps 100 strokes per minute (1½ to 1¾ Hz). Thus, the motion of piston 112 is many orders of magnitude slower than the ability of the sensors and processor to monitor and modify or modulate that motion. Controller 182 may be pre-programmed to include a reference or datum schedule of displacement as a function of time to which piston 112 is to conform. That schedule may establish a regime of relatively smooth acceleration and deceleration. The schedule may also be asynchronous, or temporally asymmetric. That is, the portion of the cycle occupied by driving piston 112 forward against the feedstock may differ from the unloaded return stroke. For example, the compression stroke may be longer, and the motion of piston 112 slower, than the unloaded return stroke. In one embodiment a ratio of this asymmetry of compression to retraction may be in the range of about 4/5:1/5 to 5/8:3/8, such that the majority of time is spent compressing and advancing the feedstock. This proportion may be deliberately selected, and may be subject to real-time electronic control, in contrast to previous apparatus.

The inventor has observed that power consumption (and, indeed, the tendency to gall or otherwise ruin the sliding surfaces) may be reduced if piston 112 can be discouraged from deviating from its orientation and from contacting the sidewall, and particularly so if a thin layer of liquid can be established between piston 112 and the adjacent cylinder wall; or if such deviation should occur, if it can be sensed before it grows unduly large and adjustments or corrections be made accordingly to tend to minimize and correct the deviation. The deviations in question may be of the order of a few thousandths of an inch, such that even small amounts of slack or tolerance build up may have a noticeable deleterious effect. To that end, controller 182 may also be programmed to monitor each shaft and actively to adjust servo valves 170, 172 to cause the various shafts to move in a co-ordinated manner in which the orientation of piston 112 relative to the direction of advance along the centerline is maintained substantially constant. With a high digital clock rate in the controller's microprocessor, to which in contrast the speed of the cylinder rod motion is infinitesimally slow, the degree of accuracy that can be obtained may be quite high. Further, to the extent that the junction of shafts 160, 162 (however many there may be) may define a moment connection permitting substantially no angular degree of freedom of head 180 or piston 112 about the y-axis (i.e., the horizontal cross-wise axis), and shafts 160, 162 are held in spaced apart slide bearings 154, 156, that may bracket pistons 150, 152, a high level of control is established over the angular orientation of the drive transmission assembly about both the z and y-axes.

Figure 3C:
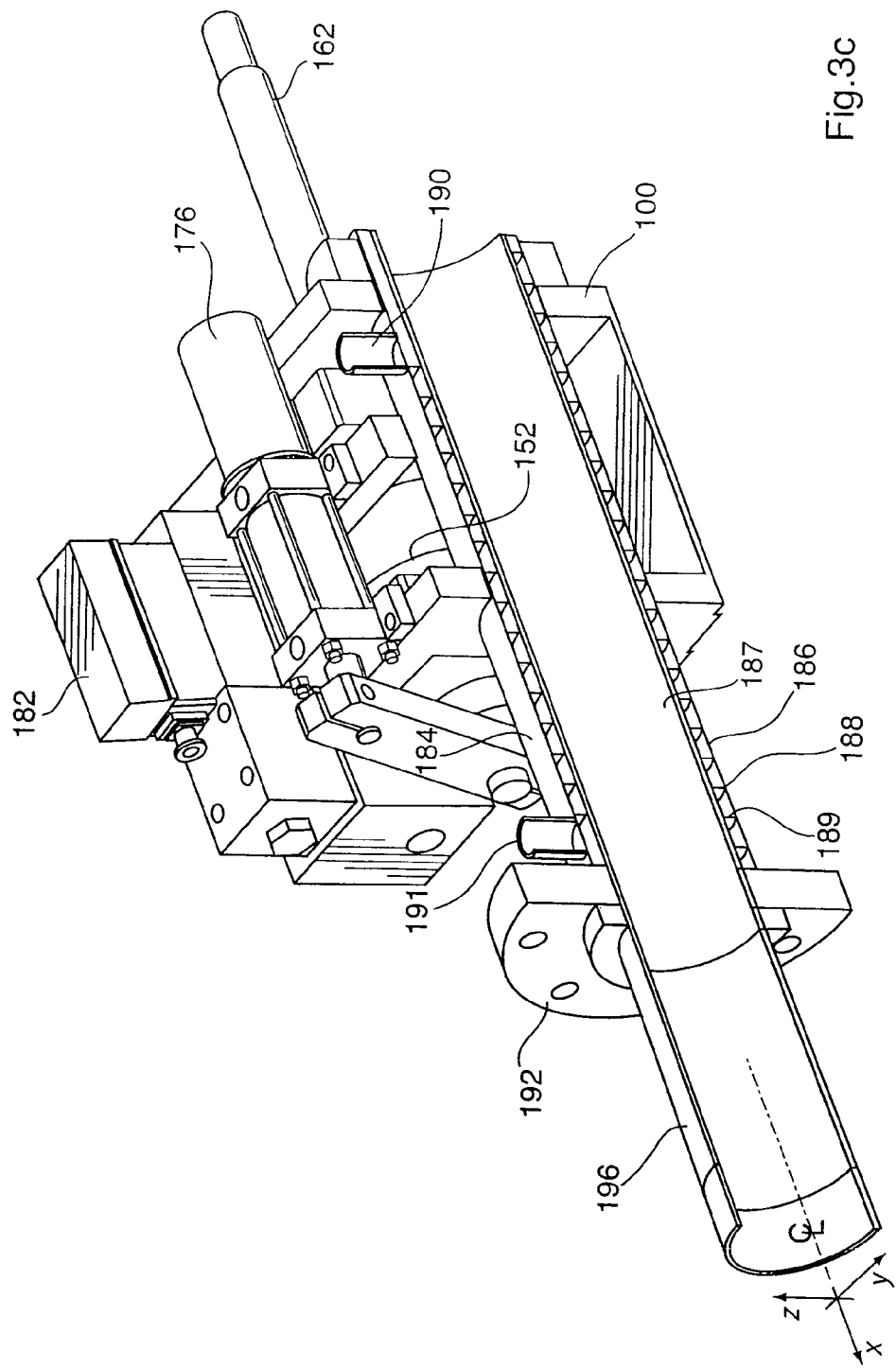
FIG. 3c shows a further partial perspective sectional view of the compressor assembly of FIG. 2a from the end of the dewatering section to the end of the compression section output feed duct.
Figure 3D:
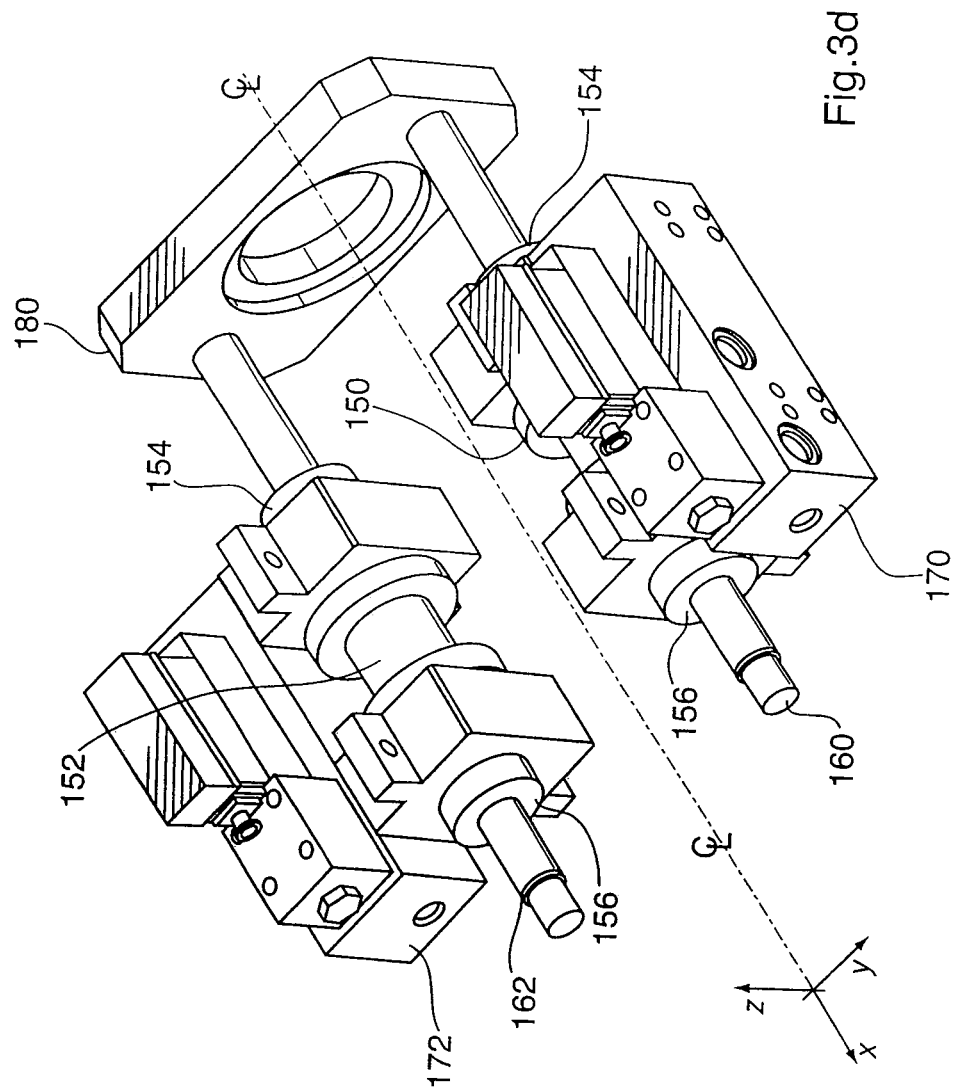
Figure 3E:
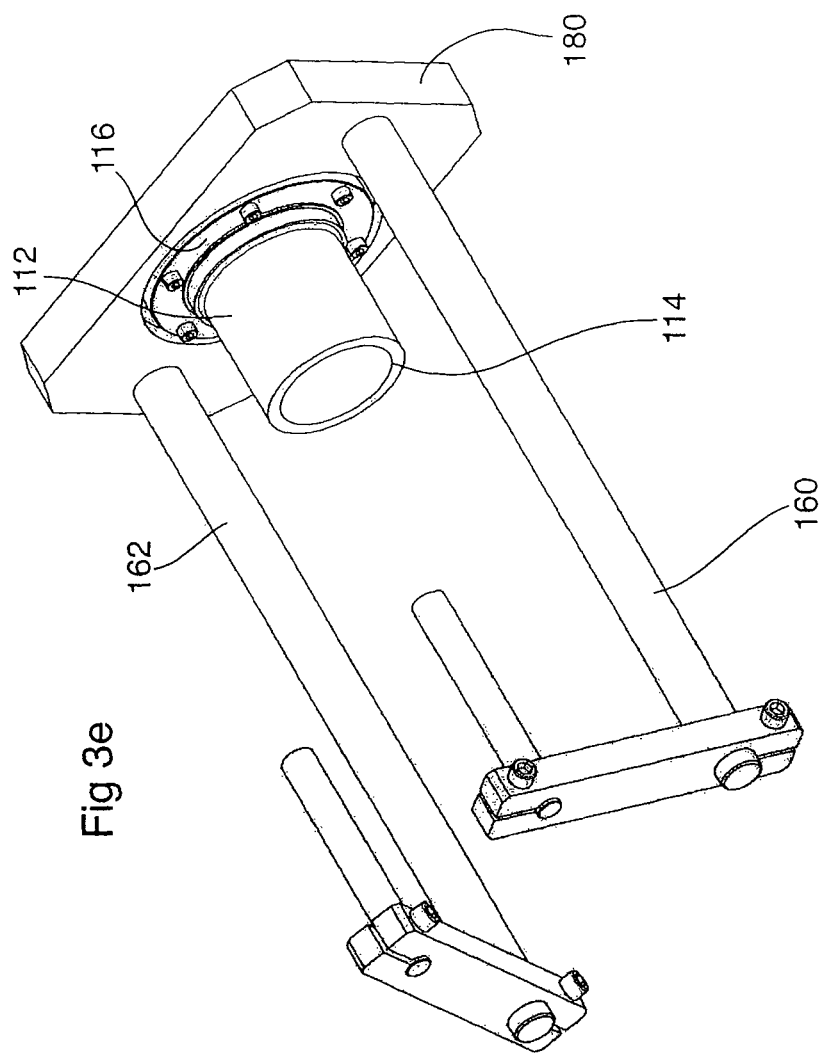
Figure 3F:
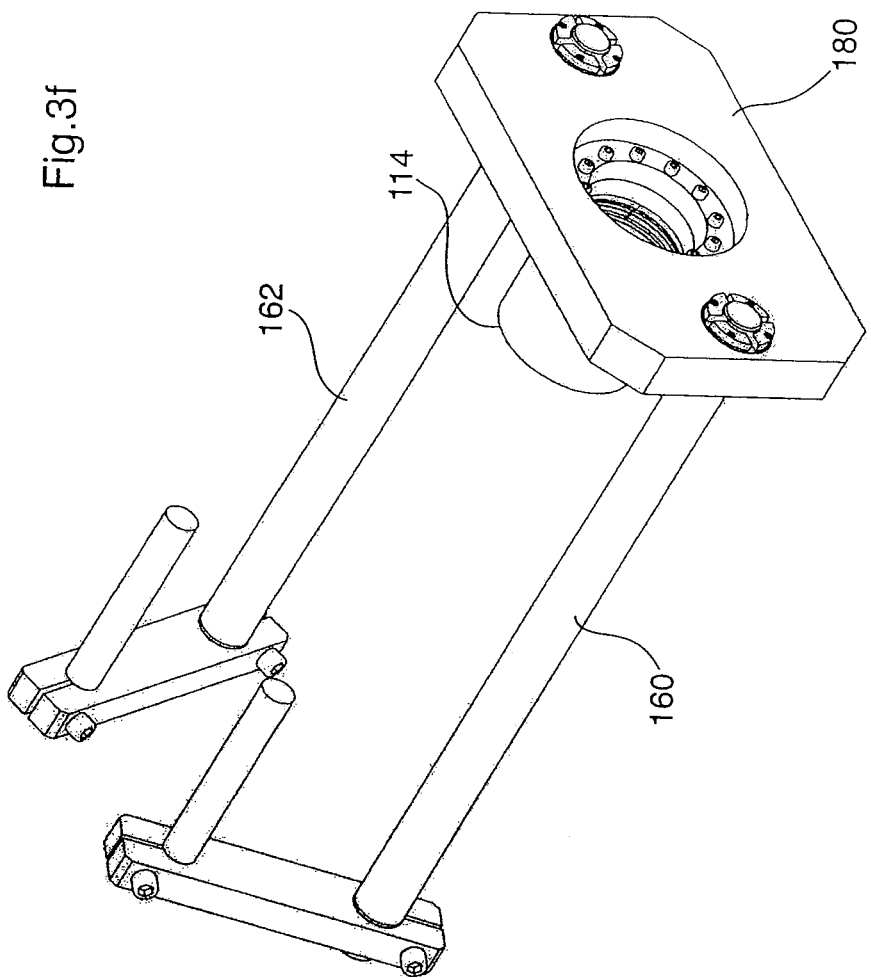
FIG. 3f shows an opposite perspective view of the components of FIG. 3e.
Figure 3G:
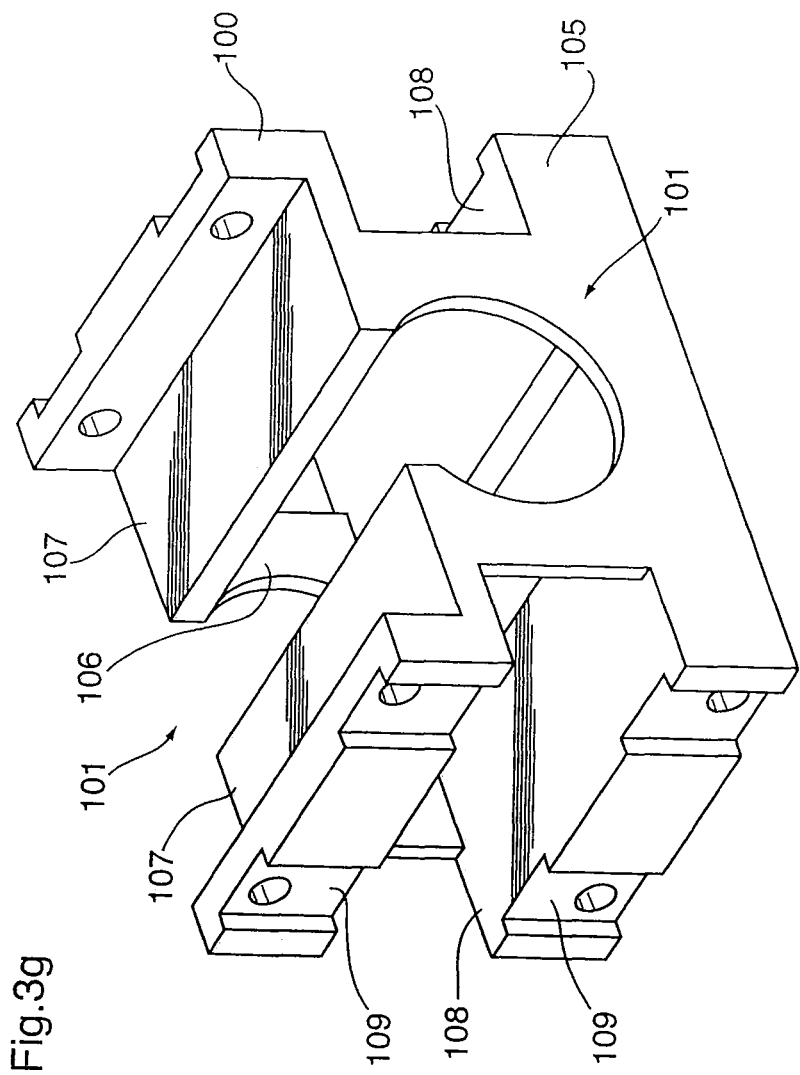
Figure 3H:
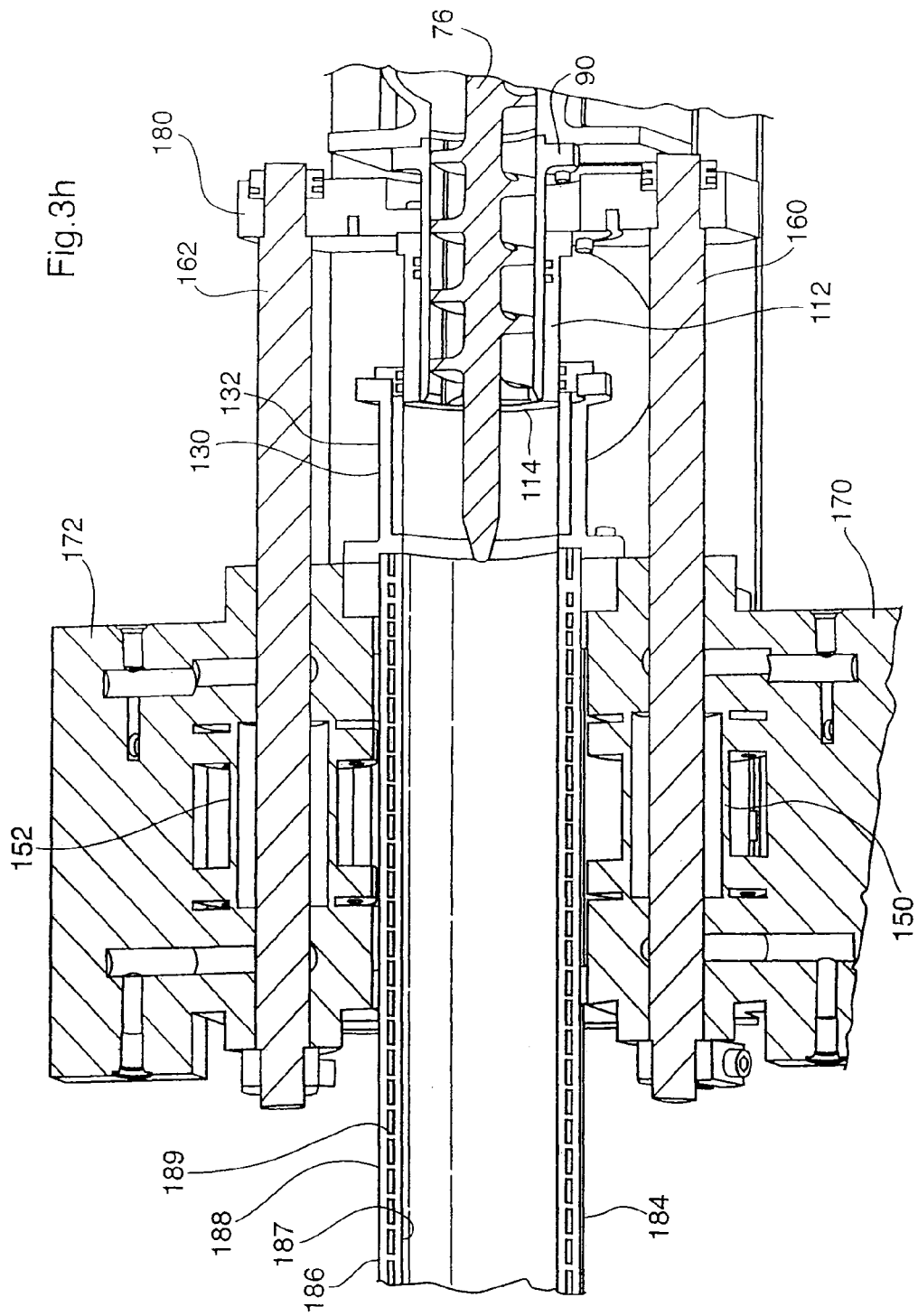
FIG. 3h shows a sectioned perspective view of the compressor assembly of FIG. 3a with the second stage compressor in a first or retracted or return, or start of stroke position.
Figure 3I:
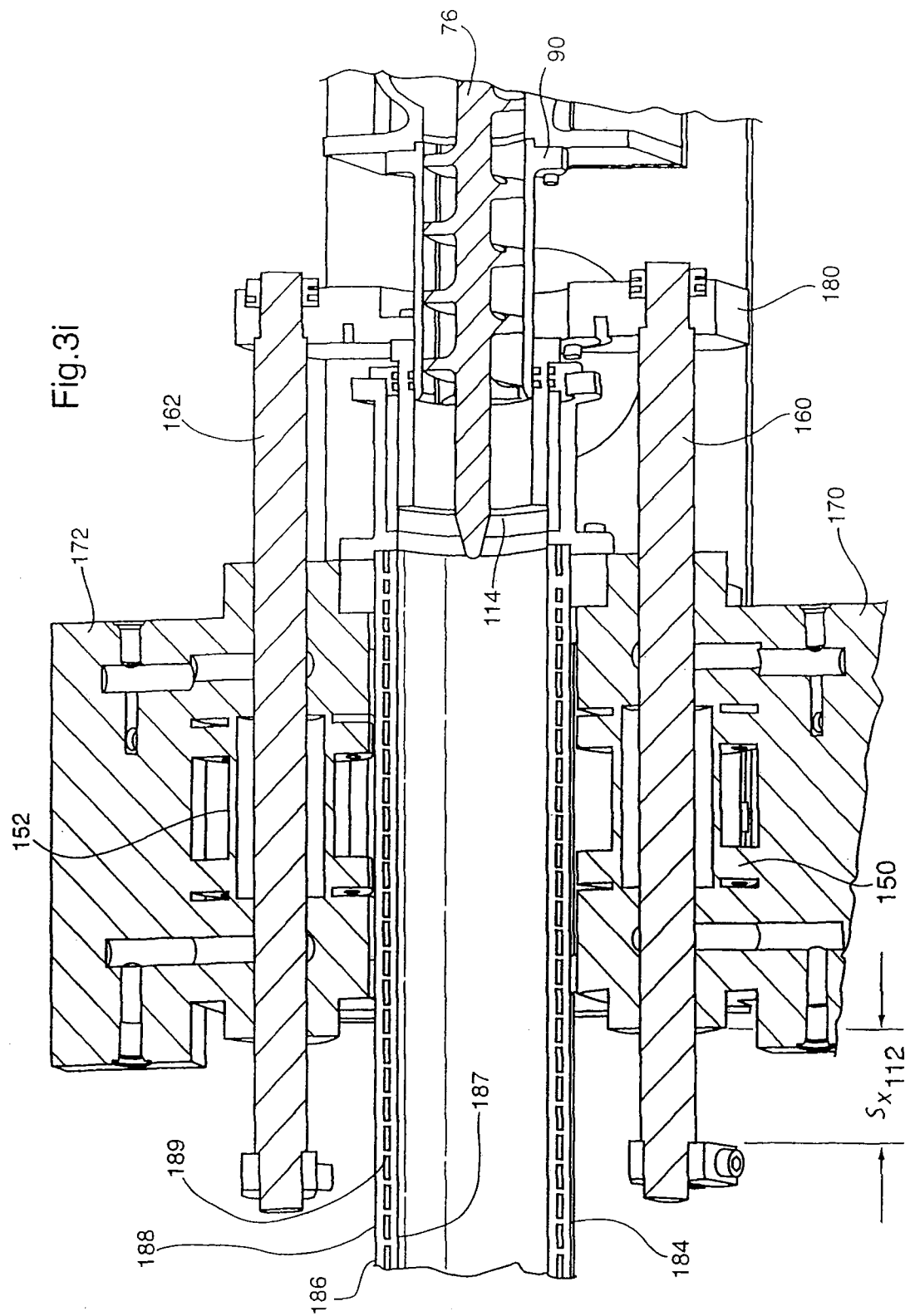
FIG. 3i shows a view similar to FIG. 3f with the second stage compressor in a second or advanced or end of stroke position.

Downstream of de-watering section 130 there is a tail pipe or discharge section, which may also be identified as a compression tube 184 through which compressed feedstock is driven by the action of the compressor stage (FIG. 3c). Discharge section compression tube 184 may include a cooling manifold, or compression tube cooling jacket, 186 having an inner wall 187, an outer wall 188 spaced radially away from inner wall 187, and an internal radially outwardly standing wall or web 189. Web 189 may be in the form of an helix, and as such may tend to compel cooling fluid, which may be water or glycol based, to circulate about the jacket in a generally helical circumferential path from coolant inlet 190 to coolant outlet 191. Inner wall 187 may have a divergent taper in the direction of flow. The angle of that divergent taper may be of the order of 30 minutes of arc. Discharge section tube 184 ends at a downstream flange 192. Flange 192 mates with a corresponding flange 194 of the reactor vessel in-feed tail pipe, or digester insert 196, which may typically be of slightly larger inside diameter than the downstream end of discharge, but which may also have the slight outward flare or taper of section tube 184. Both inside wall 187 and outside wall 188 may be circular in cross-section, outside wall 188 being cylindrical and inside wall 187 being frusto-conical. The combined length, from the dewatering section downstream flange to the choke cone seat, express in term of a length to diameter ratio, taking diameter at the outlet flange of the dewatering section, may be in the range of more than 5:1 and up to about 8:1 or about 10:1. In one embodiment this range may be about 6.4:1.

The compression process may tend to heat the feedstock. It may not be desirable to overheat the feedstock, and a location of maximum heating may be in the high friction shear zone immediately adjacent to inside wall and immediately in front of first end face 114 of piston 112. To the extent that the feedstock is a biological material containing natural sugars, once the sugars of the feedstock start to brown, for example, the quality of the feedstock and the completeness of the subsequent activity in the reaction chamber may be impaired. The cooling of inside wall 187 may tend to discourage or deter this heating process. In addition, the retention of a modest moisture layer in liquid form about the outside of the feedstock slug may tend to provide lubrication between the discharge wall and the feedstock. The inventors have observed that this effect, and, conversely, the absence of this effect, may noticeably effect the power consumption of the apparatus. It appears to the inventors that this effect may be enhanced by one or another of close control of piston position, close control of, and enhancement of the evenness of, cooling, and close control of pressure variation during compression. In the inventors view, operational temperatures of the fibre at the wall may be kept below 65 C for wood based fibers, and preferably about 60 C. The wall surface of wall 187 may be maintained in the range of about 35 to 40 C, with a maximum of 65 C.

Choke Cone Assembly 36

Figure 4A:
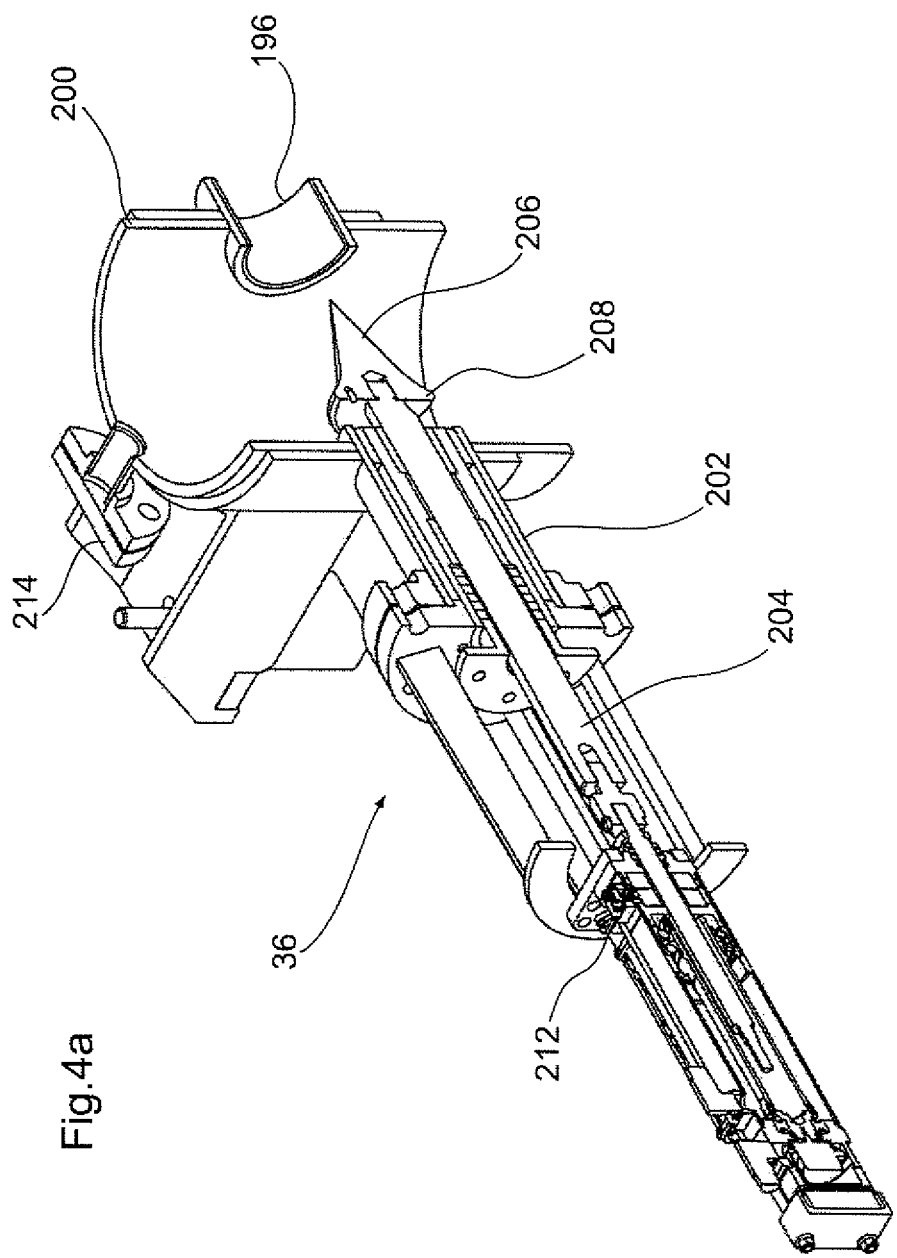
FIG. 4a shows perspective view of a feed cone assembly of the apparatus of FIG. 1a, half-sectioned vertically along the centerline.
Figure 4B:
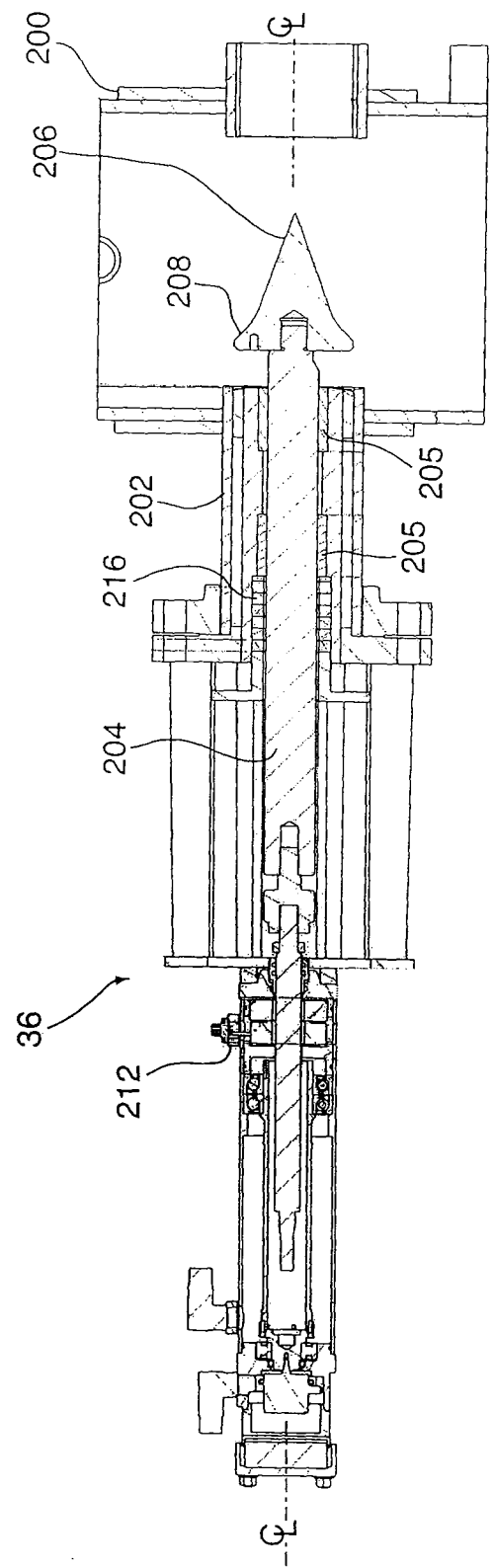
Figure 5:
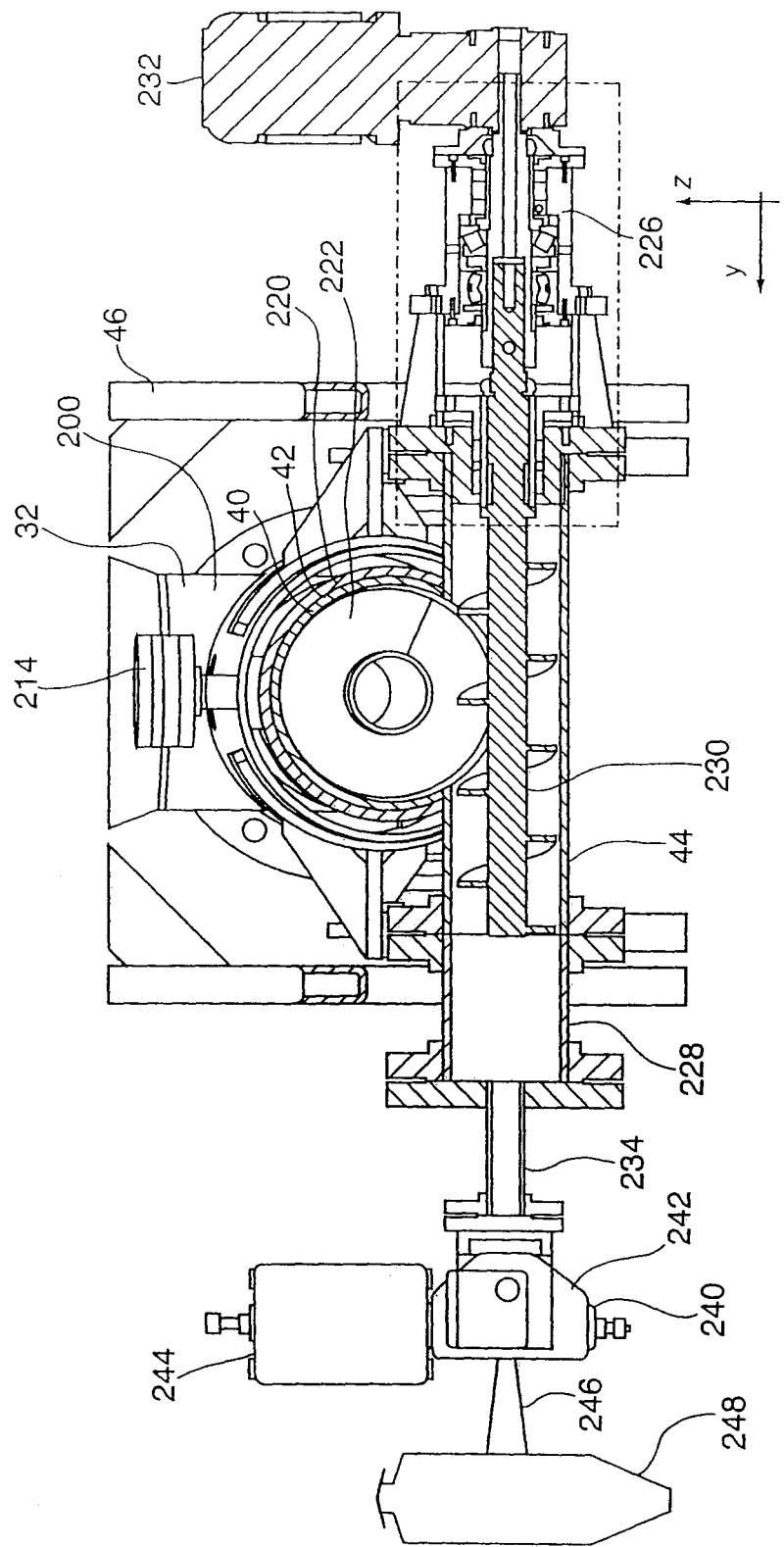
FIG. 5 is a horizontal lateral cross-section of the apparatus of FIG. 1a taken on section '5-5' of FIG. 1c.

Choke cone assembly 36 (FIGS. 4a and 4b) is mounted to vertical pipe or hydrolyzer drop chute 200 in axial alignment with, i.e., concentric with, the horizontal discharge pipe of the compression section, namely digester insert 196. It includes a horizontal stub pipe, or choke cone nozzle 202 in which a longitudinally reciprocating shaft, or choke cone shaft 204 is mounted. The inner end of shaft 204 carries a pointed, generally conical cap or choke cone 206 that is mounted in concentric axial alignment with digester insert 196. Choke cone 206 has a broadening skirt 208 such as may seat in the end of insert 196 at full extension. Assembly 36 also includes a reciprocating drive 210 mounted in axial alignment with shaft 204 on the centerline of the unit, and a sensing assembly 212, which may be a load cell, by which to sense the position of shaft 204, and hence choke cone 206, and the force acting against choke cone 206. Shaft 204 is mounted on a pair of axially spaced apart bearings 205, and passes through a set of seals or glands, identified as choke cone packing rings 216.

In operation, if there is no load on assembly 36, such as may occur when there is no feedstock material in tail pipe 196, shaft 204 moves forward to full travel to seat in the end of tail pipe 196. As feed stock collects in tail pipe 196 it is initially not significantly compressed, and tail pipe 196 remains in place as the wad of feedstock builds against it. Eventually the wad becomes substantially continuous, and is quite tightly packed, sufficiently so to lift, i.e., displace the cone 206, from its seat, and to permit egress of feedstock from tailpipe 196. Cone 206 then serves two functions, namely to maintain pressure on the end of the wad or pad of feedstock, and to split up that wad or pad when it leaves insert 196 and enters the reactor chamber.

Both compression tube 184 and digester insert 196 may have the gentle longitudinal flare or taper noted above. In operation, when piston 112 retracts, pressure from choke cone 206 tends to push longitudinally rearward on the plug of feedstock in insert 196 and tube 184. Since these members are tapered, this pressure tends to wedge the plug in place, the plug tending not to move rearwardly because of the taper. This situation remains until piston 112 again moves forward, overcoming the force applied by choke cone 206 and "lifting" the plug of feedstock off the tapered walls against which it is wedged, and urging the plug along in the forward direction. Through this process the sensors and control circuitry may be employed to determine the force to apply to shaft 204 to maintain stabilising pressure against the plug, and the timing to retract choke cone 206 as piston 112 advances, thereby tending to smooth the process.

Main Reactor Vessel or Digester Assembly 40

The main reactor chamber, or digester assembly may include a pressure vessel 220, which may have the form of a substantially cylindrical tube, with suitable pressure retaining end fittings. The cylindrical tube may be inclined on a gentle downward angle from input to output. Pressure vessel 220 may have a feedstock conveyor, or which one type may be a central retention screw 222 driven by a main motor and reduction gearbox 224. Retention screw 222 may include a hollow central shaft that is connected to a source of heat, such as steam heat, and to the extent that it is heating the volute, or paddles, or retention screw flights 223, those flights are also radially extending heat exchanger fins that establish a heat transfer interface. One advantage of such an arrangement is that it permits the introduction of heat into the reactor vessel, and hence into the feedstock, without changing the moisture content in the feedstock. Screw conveyor 222 may fit generally closely within the inner wall of the reactor vessel, such that as the screw turns, the feedstock may tend to be driven or advanced along the central axis. Pressure vessel 220 may be a double walled pressure vessel, and the space between the inner and outer walls may be connected to a source of heat, such as steam heat, it is heating the volume of the vessel as well, or may be insulated and may house heating elements, as may be appropriate for the particular industrial process for which apparatus 20 is employed. Pressure vessel 220 may be provided with a number of taps or nozzles or spray nozzles 214, 218 at which liquids or chemicals in fluid or solid form may be introduced or extracted according to the nature of the process. Pressure vessel 220 may also include heating apparatus, again, according to the desired process. As noted, feedstock is directed into the main body of the pressure vessel by the vertical digester drop zone. Feedstock may leave pressure vessel 220 at the output assembly 44. The pressure in the reactor vessel, or digester, may, in the broadest range, be in the range of 75-500 psig. A narrow range of 170 to 265 psig may be employed, and a still narrower range of 190 to 235 psig may be desired if the process is a steam only process. If acids are used to aid in breaking down the wood fibres, the pressures may tend to be toward the lower ends of these ranges. Temperatures in the reactor vessel may typically be in the range of 170-220 C, and, more narrowly, 200-210 C. The residence time of feedstock in the reactor chamber may be of the order of 4 to 14 minutes and typically 5 to 9 minutes.

Output or Discharge Screw and Discharge Tube Assembly 44

Figure 1E:
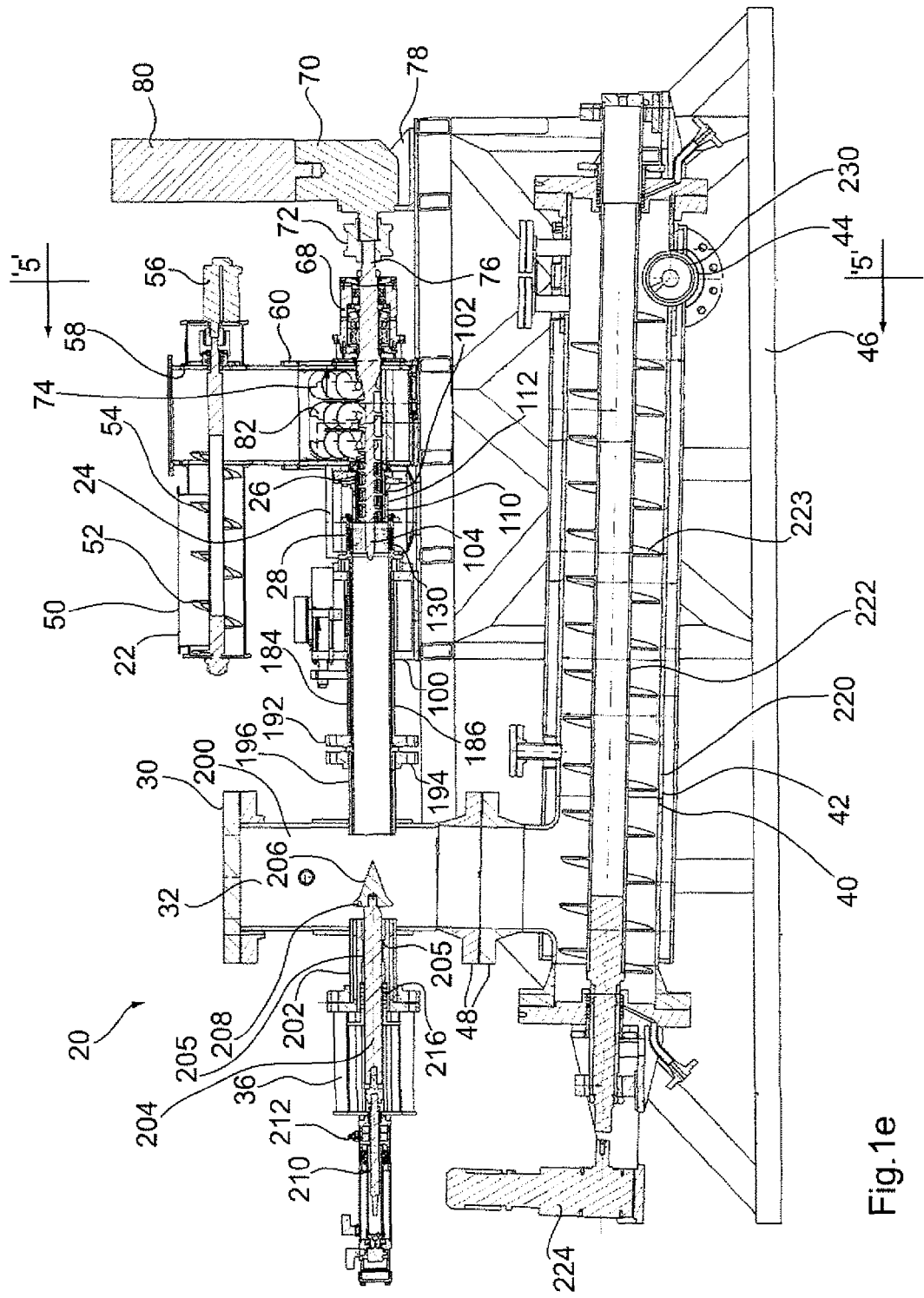
FIG. 1e is a longitudinal cross-section along the central vertical plane of the process apparatus of FIG. 1a, indicated as section '1e-1e' in FIG. 1c.
Figure 2A:
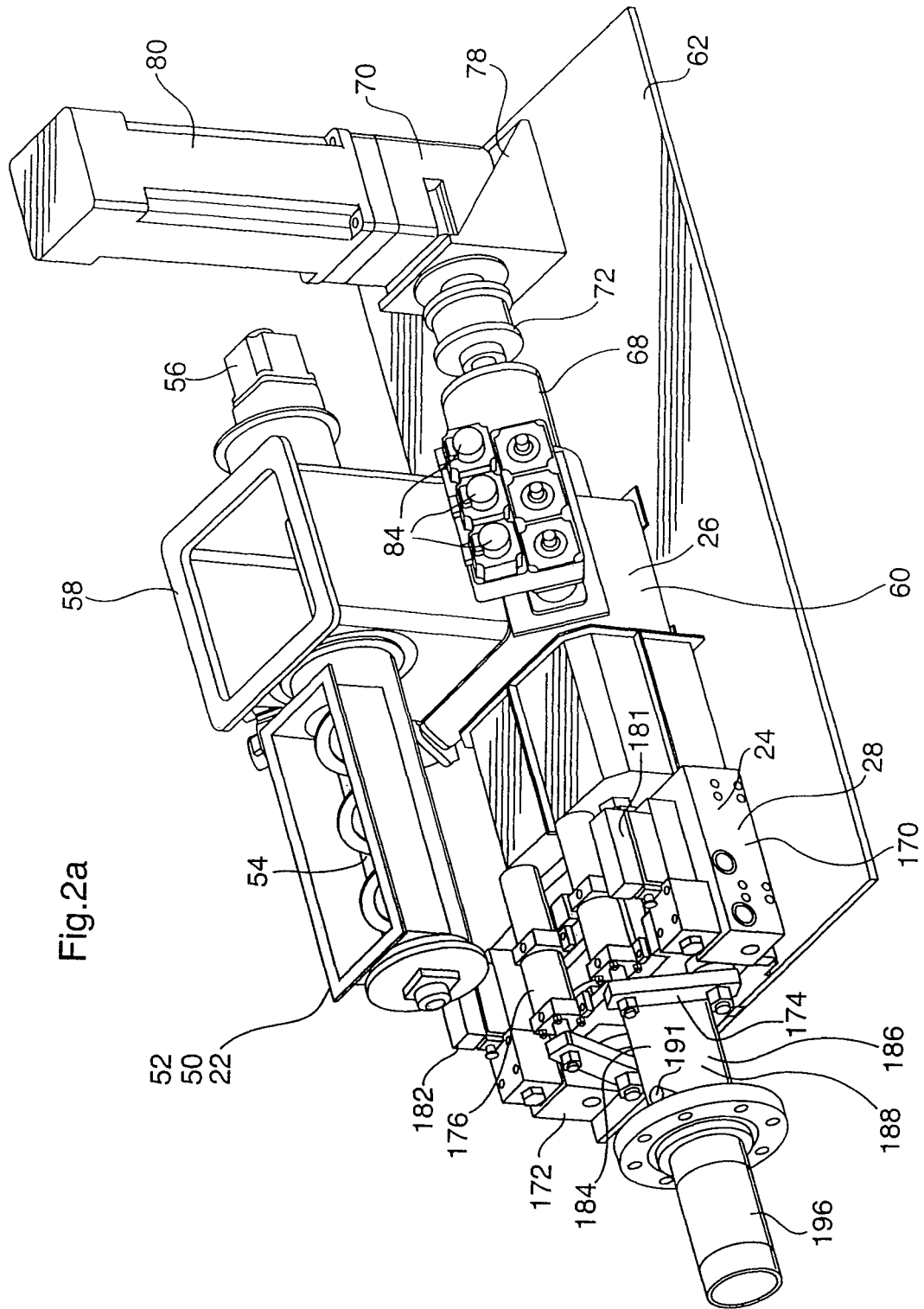
FIG. 2a is an enlarged perspective view of the feed compressor assembly of FIG. 1a; taken from above, to one side and to one end.
Figure 2B:
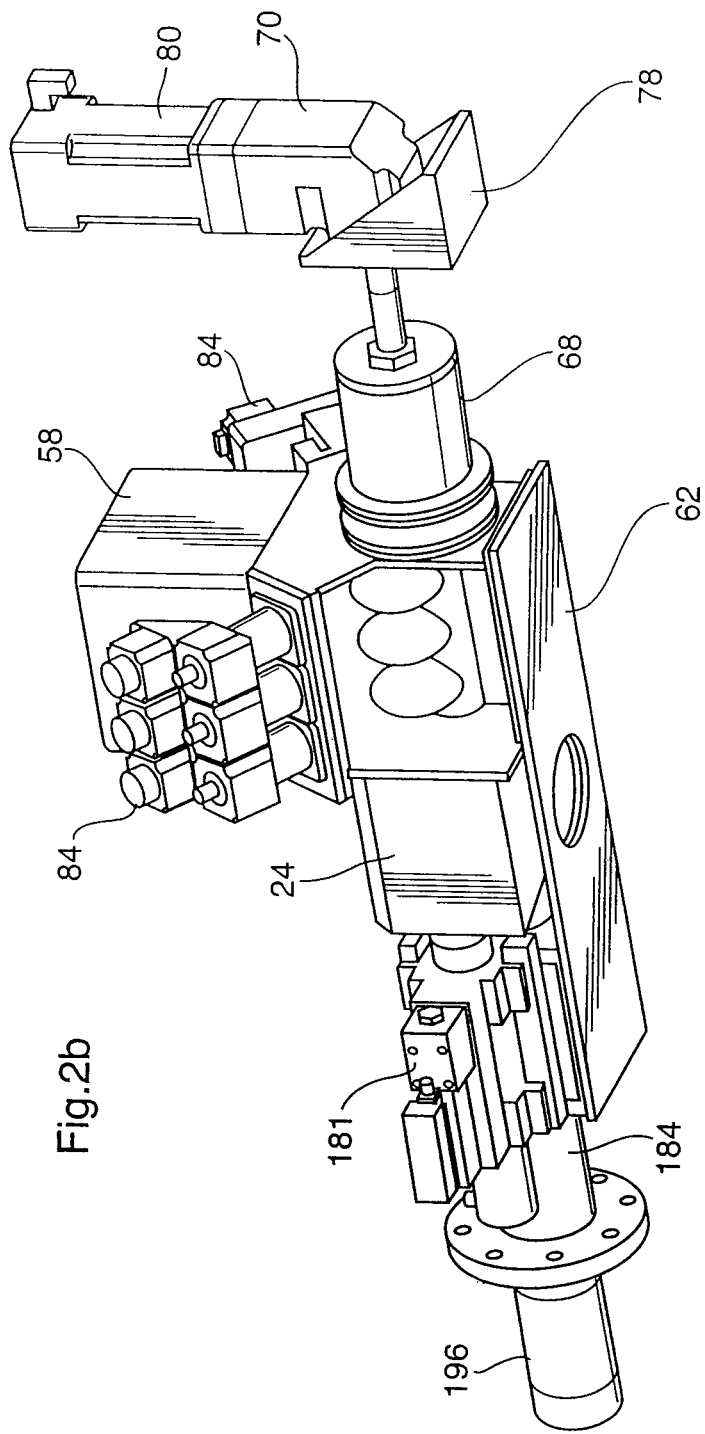
FIG. 2b is another view of the feed compressor assembly of FIG. 2a from a viewpoint below and to one side thereof.
Figure 2C:
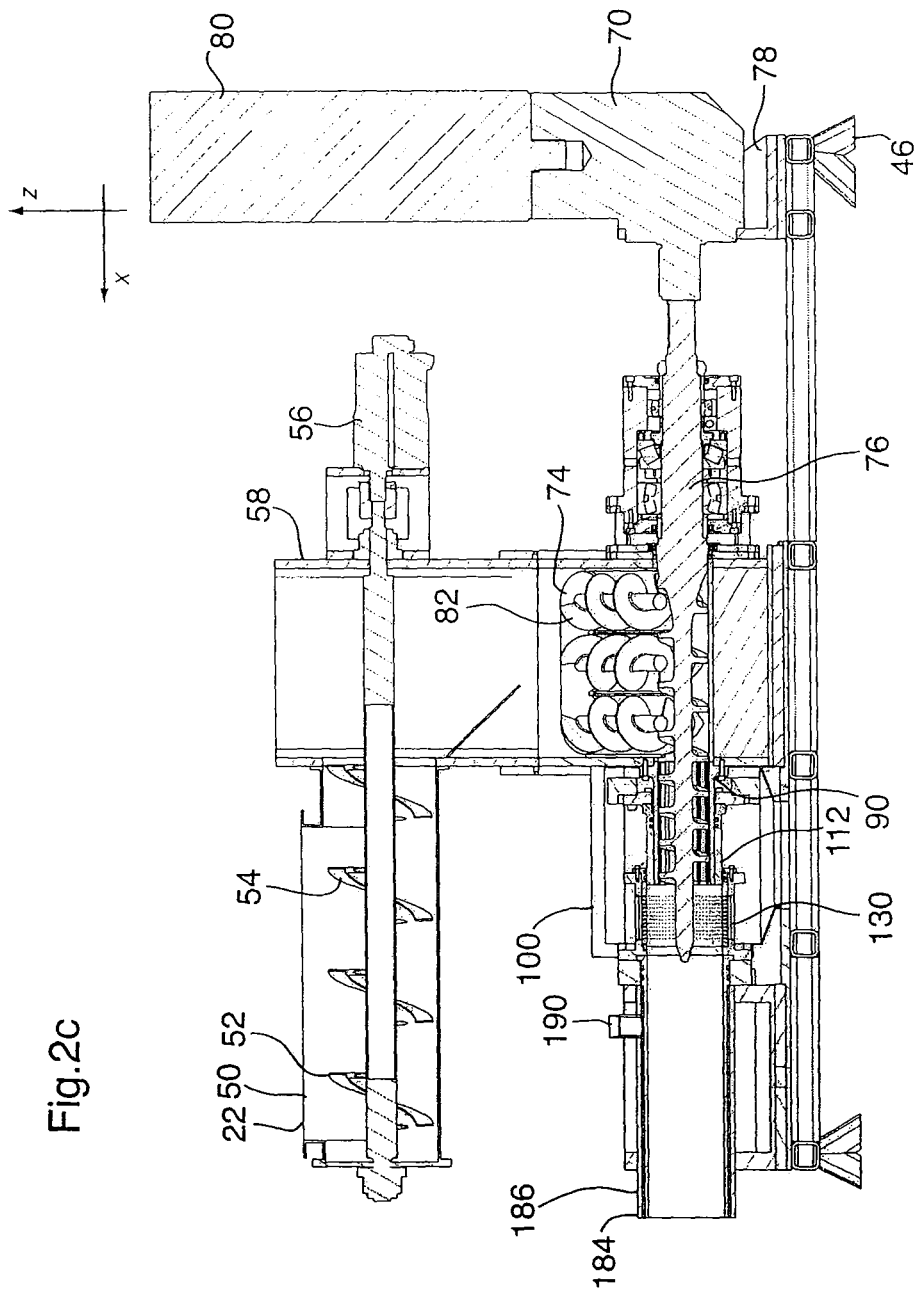
FIG. 2c shows a vertical longitudinal cross-section of the assembly of FIG. 2a taken on the longitudinal centerline thereof.
Figure 2E:
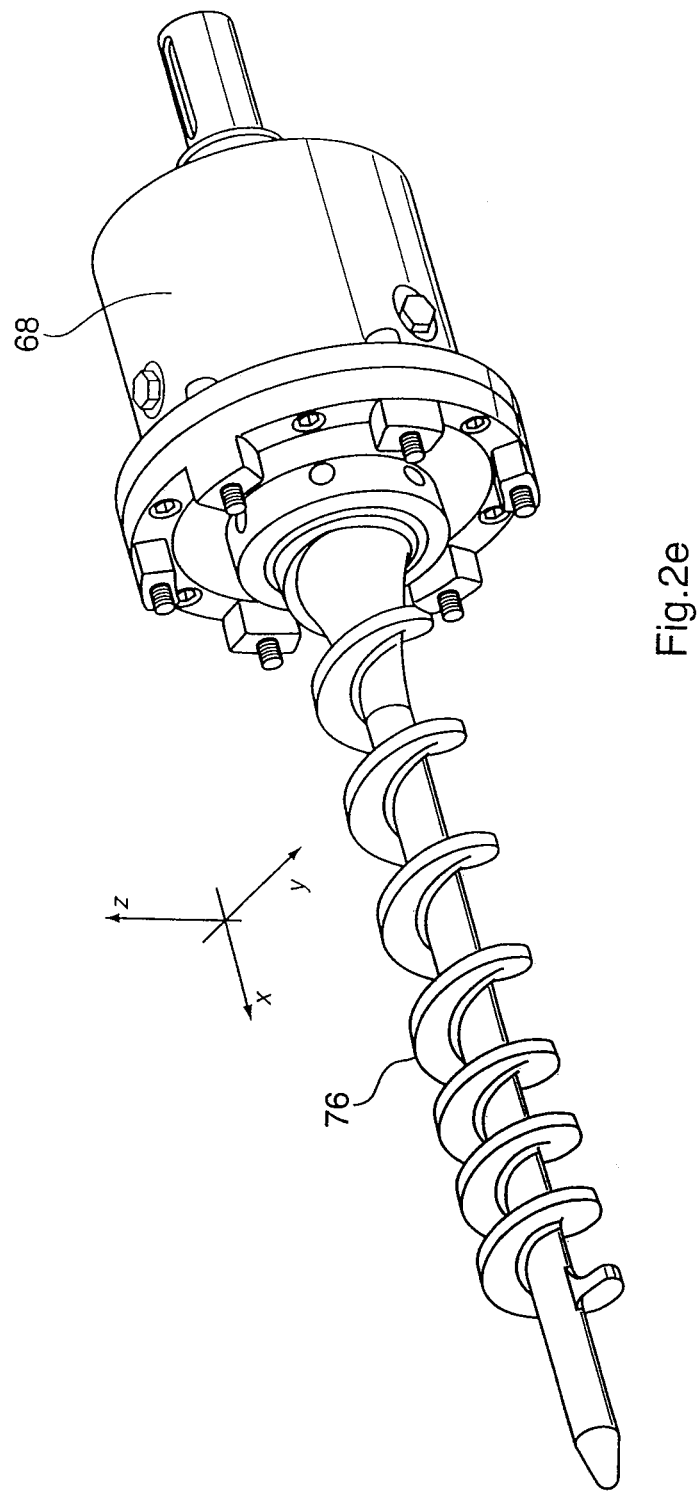

The discharge, de-compression, or output assembly, which may also be termed the discharge screw and discharge tube assembly, 44 may be mounted cross-wise to the main longitudinal axis of the reactor vessel, e.g., pressure vessel 220. There may be two pipe stubs, those being a drive stub and an output stub or pipe flanges 226, 228 respectively mounted to, and forming arms or extensions of, pressure vessel 220. A screw or auger or discharge screw 230 may be mounted between the retention screw bearing arrangement and digester discharge tubes 226, 228, e.g., at a level rather lower than the centerline of pressure vessel 220. Auger 230 may be driven by a motor, or discharge screw drive 232. Screw 230 passes beneath, and clear of, the main screw, namely pressure vessel retention screw 222. The volute of retention screw 222 ends just before, i.e., longitudinally shy or short in the direction of advance of, cross-wise mounted discharge screw 230, as shown in FIG. 1*e*. The transverse discharge screw 230 feeds an output duct, or pipe identified as discharge tube 234, which, in turn carries feedstock to an outflow governor, such as an outlet valve 240, which may be termed a blow valve. The output duct or pipe or discharge tube 234 in effect defines a first-in-first-out output collector or accumulator or discharge antechamber. It is conceptually somewhat similar to an electrical capacitor in which a charge or plug of material for output can be accumulated in the collector awaiting discharge. The plug has in part a function somewhat akin to a wadding in a gun barrel where, in desired operation, there will always be a pad or plug or wadding of porous feedstock obstructing the outflow. The size of the pad or plug waxes and wanes as the outflow valve opens and closes extracting material from the downstream end of the pad or plug, with the pad being constantly replenished on its upstream end by the action of screw 230. Transverse screw 230 then functions as a drive or packer. It forms and packs a wad or charge or pad of feedstock in the collector. If the pad is sufficiently large, the quantity of the charge will be less than the amount discharged in one cycle of the valve. The end of stub 228 extending longitudinally beyond the tip of auger 230 may have a flare, or outward taper in the downstream direction, comparable to the flare of the infeed pipe from the compressor discharge section, to discourage the feedstock from jamming in the pipe. The taper may be about 30 minutes of arc.

Outlet valve 240 may be a ball control valve 242, of which one type is a Neles Series E ceramic ball valve such as may be used in abrasive applications where erosion resistance may be desirable and which may not necessarily be shown to scale in the illustrations. The flow path of this valve may be lined with a material that includes magnesia partially stabilized with zirconia. Valve 242 is a motorized valve, and may include a drive or drive motor, identified as blow valve servo motor 244, which may be a stepper motor with continuous speed variation. As above, the clock speed of the digital electronic monitoring and control equipment may be of the order of 1 GHz, while the frequency of blows may be of the order of 30-60 Hz.

A typical internal pressure may be in the range of 245 psig at a saturated mixture of steam, for example. The rate of motion of ball valve 242 may be such that the period of opening is somewhat like the opening of a camera shutter or aperture, or nozzle, and in that short space of time the feedstock exits the reactor in what is more or less an explosion. The rapidly depressurizing feedstock may be blown through the open aperture or nozzle defined by ball valve 242 at quite high velocity, particularly if, at the same time, there is an adiabatic, isentropic expansion as the moisture in the feedstock changes state from liquid to gas, e.g., water vapour. Processed feedstock leaving ball valve 242 may be discharged through outlet ducting, which may be in the form of a broadening passageway, which may be a diffuser, indicated conceptually as 246. The output flow may then expand and decelerate in the diffuser. The outlet ducting may be connected to a settling chamber or cyclone, indicated conceptually as 248, at which the processed feedstock may be separated from the liberated steam, and may further decelerate and settle out of the carrier gas (i.e., steam) flow, and may be collected, and whence it may be removed to storage or for further processing, such as use as feedstock in producing ethanol or other products. Motor 244, diffuser 246, and cyclone 248 may not be shown to scale in the illustrations.

Alternate Second Stage Compressor

Figure 6:
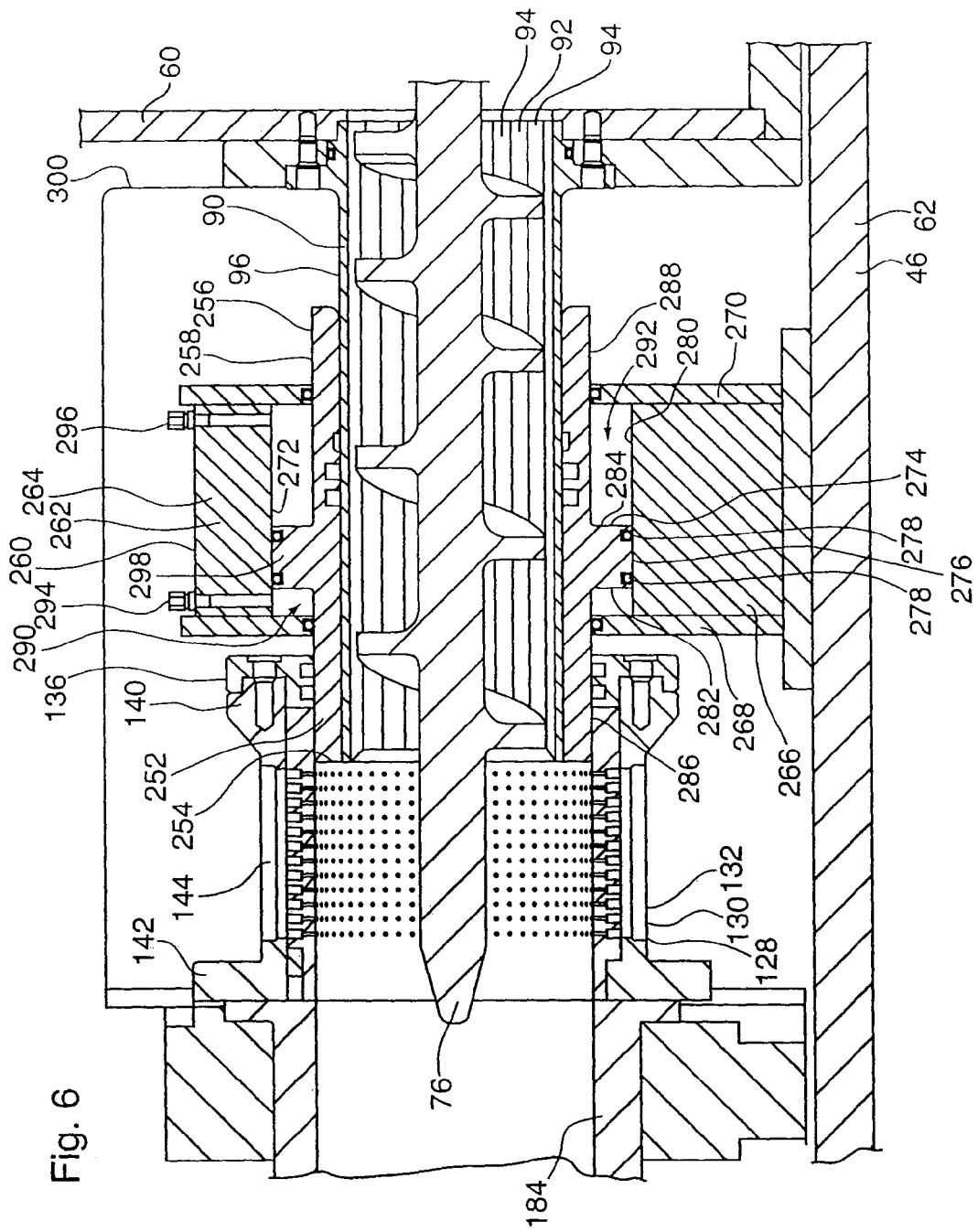

FIG. 6 shows a sectioned view of an alternate second stage compressor or piston zone arrangement to that of second stage compressor 28 described above.

As described above second stage compressor 28 provides an apparatus that has only a single degree of freedom of motion (i.e., linear reciprocation in the x-direction) and no slack between the force input interface at pistons 150, 152 of the hydraulic cylinders and the force output interface where the piston front face of first end 114 of piston 112 meets with the feedstock work piece material being compressed. To the extent shafts 160, 162, crosshead 180, and piston 112 may be considered a single rigid body, all points of that rigid body being movable relative to a reference datum, such as the stationary cylinder end wall of one of the actuator pistons, be it 150 or 152, as may be.

In the example of motion drive and transmission assembly 110, the mechanical drive train, or transmission, or rods 160, 162, and head 180, is connected to piston 112 at an input force transfer interface or connection at the mounting at second end 116. However, subject to maintaining a suitable range of longitudinal travel, it could have been connected at some other input force interface connection location elsewhere along the body of piston 112 between first and second ends 114, 116.

As shown in FIG. 6, in an alternate arrangement the input piston arrangement may be that of a single piston, and it may be that of an annular piston, or peripheral piston (or array of peripheral pistons) where the body of the piston extends outwardly from the piston wall itself.

For example, an alternate motion drive and transmission assembly is indicated generally as 250. It includes a moving compression member identified as an output or compression piston 252, which is the "second stage compressor" operable to provide the second stage of compression relative to the first stage of compression associated with compression screw 76 (which remains as before). Like piston 112, compression piston 252 is hollow and extends peripherally, (or circumferentially) about an internal sleeve such that compression piston 252 is shaped to extend about at least a portion of the first compression stage. In the embodiment shown this internal sleeve is compression screw sleeve 90, as before. There are piston rings and seals between sleeve 90 and piston 252 in the same manner as between sleeve 90 and piston 112 described above. Sleeve 90 is stationary, being rigidly mounted to feeder hopper input housing 60, as previously.

Piston 252 includes a cylindrical body with a bore defined therein just like the bore of passageway 120. The cylindrical body includes a first end 254 and a second end 256. Like first end 114, first end 254 defines the output force transfer interface at which output piston 252 works against the feedstock materials to be compressed. Second end 256 has the form of a trailing skirt. The bore may be such that the body may be conveniently a hollow round circular cylinder, though it need not necessarily be circular, having an inner surface, just like surface 122, facing sleeve 90, and an outer surface 258 facing away from sleeve 90. The inner surface may have appropriate grooves for rings or seals for co-operation with sleeve 90, as may be. As with first end 114, first end 254 reciprocates in the longitudinal direction (i.e., parallel to the x-axis) within the co-operating mating cylinder of the input end of dewatering section 130, with which its shape conforms, and has the same relationship of seals and rings. Dewatering section 130 is rigidly mounted to discharge section tube 184, just as before.

Output piston 252 is, in effect, carried within the body of an input actuator 260, which may be identified as an hydraulic cylinder 262. Expressed differently, the cylindrical body of piston 252 passes through input actuator 260, such that input actuator 260 may be said to be mounted peripherally about part of the length of piston 252. In this instance, hydraulic cylinder 262 has a body 264 that is rigidly mounted (e.g., bolted or welded) to base plate 62, and, ultimately, to frame 46. Body 264 includes a central portion, or core, 266, a first end plate 268, and a second end plate 270. Core 266 has a bore 272 formed therein, bore 266 being sized to accommodate the outwardly extending flange or wall or shoulder, identified as portion 274 that protrudes radially outward from the predominantly cylindrical body of piston 252., and extends peripherally thereabout. Wall portion 274 includes a circumferentially extending peripheral wall or surface 276 that includes suitable grooves for seals 278 that slidingly engage the inwardly facing actuator cylinder wall surface 280. Portion 274 includes a first shoulder face, which may be a first annular surface 282, and a second shoulder face, which may be a second annular surface 284. Surface 282 faces toward first end plate 268, while surface 284 faces toward, and stands in opposition to, second end plate 270.

First end plate 268 has a bore formed therein of a size closely to accommodate a first end portion 286 of outer surface 258 in a sliding relationship, an appropriate groove, or seat, being provided for an 0-ring or other seal as indicated. Similarly, second end plate 270 has a bore formed therein to accommodate a second end portion 288 of outer surface 258, again with a groove and a seal. In this way two annular chambers are formed, those chambers being a first, or retraction or return, chamber 290 bounded axially between first end plate 268 and first annular surface 282, and bounded radially and circumferentially by portion 286 and surface 280; and a second, or advance, chamber 292 bounded axially by second end plate 270 and second annular surface 284, and bounded radially and circumferentially by second portion 288 and surface 280. A first motive power fluid port 294 is provided in body 264 to first chamber 290, and a second motive power fluid port 296 is provided in body 264 to second chamber 292. Hydraulic lines (not shown) are connected to each port, and conventional valves are connected to permit high and low pressure connections to be made. By admitting high pressure fluid to first chamber 290 piston 252 may be caused to advance; by admitting high pressure fluid to second chamber 292 piston 252 may be caused to retract or return, the size of the chambers expanding and contracting accordingly. In this arrangement, the outwardly extending portion or wall, 274, is, or functions as, the actuator piston or input interface piston 298.

Assembly 250 further includes a controller 300, substantially similar in nature and operation to controllers 181 and 182, above. In this instance the position of second end 256 of piston 252 may be monitored by controller 300. Hydraulic pressure in the working fluid in chambers 290 and 292 can be modulated as above to produce a desired schedule of displacement as a function of time, and the forward stroke need not be equal in time to the rearward stroke, and so on, as above. In this operation, either the first end plate or the second end plate may be used as a stationary base or datum, or origin, or frame of reference.

In assembly 250, then, the fluid works against the annular surfaces of the actuator piston to produce displacement relative to the chosen datum surface or surfaces. Those surfaces are force input interfaces, and those force input interfaces are rigidly mounted, connected, positioned or oriented, relative to the output interface at first end 254. As before, piston 252 is restricted to a single degree of freedom of motion, namely linear reciprocation in the longitudinal direction. As before, there is no slack between the input and output interfaces of the moving members of the second compression stage. The difference is that the piston rod and connecting yoke, and their corresponding mass, has been eliminated, or rather replaced by an annular piston face, the remaining "transmission" between input and output, amounting to the annular portion or wall that carries the motive force in shear, and the cylinder wall itself, which carries the motive force in compression (when driving the work piece material), as a hollow short column in axial compression. The cylinder itself then become the common base structure, or common member, or common element linking, or shared by, both the actuator piston 296 and the output piston 254—one common part thus carries both the input and output force transmission interfaces. I.e., the moving compression member includes both the input and output force transfer interfaces, and thus both the actuator piston and the compression piston, in one member. Alternatively, the continuous circumferential faces 282, 284 of the annular actuator piston can be thought of as being equivalent to a very large number of pistons operating around the circumference of the second compressor stage. Indeed, the annular piston need not be continuous, but could be an array of tabs or lugs at discreet circumferential intervals, e.g., three lugs spaced on 120 degree centers, four lugs spaced on 90 degree centers, and so on. A continuous annular chamber has the virtues of relative simplicity of construction, and automatic pressure equalization about the annular face.

Operation

Piston 112 (or 252, as may be) is, or substantially approximates, a positive displacement device. It is also a device that may tend to impose the peak compression on the feedstock, and therefore the peak heat input. As such, the operation of piston 112 (or 252) may serve as a reference, or datum, for the operation of other components of processing apparatus 20.

In previous, passive, or passively controlled, apparatus, the rate of reciprocation of the second stage piston was not directly controlled. Rather, in one type of system, the pressure inlet valve for the advance stroke would open, and the piston would drive forward under the urging of the available hydraulic pressure at such rate as might be. This might continue until a forward travel limit switch was tripped, at which point the forward travel input valve would close, and the return travel valve would open to cause the piston to reciprocate rearwardly. Alternatively, in a system with a flywheel and a crank, the piston would advance and retract as dictated by the turning of the motor and flywheel against the resistive pressure in the load. In the hydraulic ram system, then, neither the time v. distance nor the force v. distance profile was controlled or constant. Among many possible outcomes of this kind of apparatus, there would be an instantaneous pressure surge in the work piece, which might lead to overheating or rubbing of the piston against the cylinder wall; on retraction the piston might tend to work against the main screw, with a resultant surge in power consumption.

By contrast, the use of a controlled time v. displacement schedule permits control over the pressure pulse applied to the work piece, and hence also to its heating. Further, since the apparatus may include feedback sensors for both piston 112 (or 252) and screw 76, the rate of advance of the screw, and hence its power consumption, can be modulated in real time in co-ordination with the operation of piston 112 (or 252). The piston feedback sensors may include sensors for monitoring position displacement and speed, force, hydraulic supply and return pressure, and hydraulic motor current. The drive screw sensors may include sensors operable to monitor angular position, displacement, speed, output torque, longitudinal thrust loading on the screw shaft, motor current, and motor shaft rotational position and displacement.

For example, assuming that initial starting transients have been resolved, a steady pressurized wad of feedstock has been established in tail pipe 196, that pad also bearing against the choke cone 206, and that apparatus 20 is now running substantially at steady state. As piston 112 (or 252) is retracted, or is in the retraction stage of its operating cycle, the power to screw 76 may be reduced or held steady by decreasing the rate of advance of the screw. Then, in the forward or advancing portion of its operating cycle when piston 112 (or 252) and screw 76 are working in the same direction, and the action of piston 112 (or 252) may tend to unload screw 76, screw 76 may be advanced, i.e., turned, more rapidly. This control may be either an explicit control on the rotational speed of the motor, and hence of the screw, or it may be a control on motor current draw or a combination of the two. For example, there may be a scheduled speed of advance, provided that the motor current draw does not exceed a maximum value. In either case the system includes sensors operable to generate a warning signal and to move the system to a passive off-line, i.e., inoperative dormant status, in the event that either the force sensed at either piston is too high, or if the motor current exceeds a governed maximum. Inasmuch as the timing and displacement of the piston stroke are known, the operation of screw 76 may anticipate the motion of piston 112 (or 252) relative to and may itself be pre-programmed according to a pre-set schedule, with a suitable phase shift, as may be, or it may be adjustable in real time in response to observations of force and displacement of piston 112 (or 252).

Similarly, rather than being passive, choke cone assembly 36 may be active. That is, rather than merely being subject to a fixed input force, be it imposed pneumatically or hydraulically; or a spring loaded input force such as imposed by a spring, all of which must be overcome by the piston to cause advance of feedstock into the main reaction vessel, choke cone assembly 36 may be positively driven. That is to say, choke cone assembly 36 may be advanced and retracted either on the basis of a pre-set schedule, or in response to real-time feedback from piston 112 (or 252), and may be responsive to instantaneous load and rate of change of load as sensed at sensing assembly 212 (or 252). Thus, as piston 112 (or 252) advances, choke cone assembly 36 may be retracted somewhat to reduce the peak loading. When piston 112 (or 252) ceases to advance, and returns backward, choke cone assembly can be advanced to maintain a desired pressure level in the feed-stock pad. After processing through the reactor vessel, i.e., the digester, the feedstock is decompressed through the blow valve as described above.

By either or all of these features alone or in combination, active control of the displacement v. time and force v. time profiles may serve to reduce peak loading, to smooth the pressure profile over time in the feedstock, thereby reducing the tendency to local overheating, and tending to reduce the peak cyclic forces in the equipment, e.g., by reducing or avoiding spikes in the load history as a function of time. This may permit the use of a smaller motor, and may permit a lighter structure to be used. It may also reduce wear and damage to the equipment and may tend to reduce power consumption.

Various embodiments have been described in detail. Since changes in and or additions to the above-described examples may be made without departing from the nature, spirit or scope of the invention, the invention is not to be limited to those details.

I claim:

1. A two stage compressor feed apparatus operable to compress loose feedstock material, said feed apparatus comprising:
   a first compressor stage and a second compressor stage;
   said first compressor stage having a screw, said screw having a volute operable to drive the feedstock forward in an axial direction while compressing the feedstock;
   said second compressor stage having an axial accommodation permitting an end of said screw to extend therethrough;
   said first compressor stage having a drive connected to operate said screw;
   said drive being a variable speed drive;
   sensors mounted to monitor operation of said screw and said second compressor stage;
   a controller operable to receive signals from said sensors and to control operation of said screw; and
   said controller being operable continuously to vary operating speed of said drive in response to operation of said second compressor stage:
   said second compressor stage has a duty cycle, said duty cycle including a first portion and a second portion;
   during said first portion of said second compressor stage duty cycle said controller is programmed to urge said screw to operate in a first speed regime, and in said second portion of said second compressor stage duty cycle said controller is programmed to operate said screw in a second, different speed regime;
   said first portion of said dut cycle is a piston advancing portion, and said second stage of said duty cycle is a piston retracting portion; and
   said controller is programmed to reduce speed of said screw during said piston retracting portion of said duty cycle, and to increase speed of said screw during said piston advancing portion of said duty cycle.

2. The two stage compressor feed apparatus of claim 1 wherein said screw has a volute, and pitch between flights of said volute varies therealong.

3. The two stage compressor feed apparatus of claim 1 wherein said pitch varies continuously along said screw, said pitch decreasing in spacing toward a distal tip of said screw.

4. The two stage compression apparatus of claim 1 wherein said second compressor stage includes a piston, said piston being axially reciprocable relative to said screw.

5. The two stage compression apparatus of claim 1 wherein:
   said first stage screw has a discharge tip, said discharge tip being surrounded by a sleeve;
   said sleeve being an axially stationary sleeve;
   said second stage piston surrounding said sleeve, and being axially reciprocable relative thereto;
   said sleeve having an interior face oriented toward said screw; and
   said interior face of said sleeve having axially extending reliefs defined therein.

6. The two stage compression apparatus of claim 1 wherein said controller is programmed to monitor electrical motor current to said drive, and to maintain said electrical motor current below a maximum value during operation of said apparatus.

7. The two stage compression apparatus of claim 1 wherein:
   said screw has a proximal end mounted to said drive and a distal tip distant therefrom;
   said second compressor stage is a piston compressor stage having a piston mounted co-axially with said screw;
   a stationary sleeve is mounted co-axially about said distal tip of said screw, said sleeve having an internally axially grooved wall facing said screw; and
   said piston is an annular piston mounted about said sleeve for axial reciprocation relative thereto.

8. The two stage compression apparatus of claim 7 wherein said apparatus includes a de-watering zone, and said screw discharges through said piston into said de-watering zone.

9. A two stage compression process for compressing loose feedstock material, comprising:
   providing a first compressor stage and a second compressor stage, said first compressor stage having a screw, said screw having a volute operable to drive the feedstock forward in an axial direction while compressing the feedstock;
   said second compressor stage having an axial accommodation permitting an end of said screw to extend therethrough;
   said first compressor stage having a drive connected to operate said screw;
   said drive being a variable speed drive;
   sensors mounted to monitor operation of said screw and said second compressor stage;
   a controller operable to receive signals from said sensors and to control operation of said screw; and
   operating said controller continuously to vary operating speed of said drive in response to operation of said second compressor stage;
   said second compressor stage has a duty cycle, said duty cycle including a first portion and a second portion;
   during said first portion of said second compressor stage duty cycle said controller is programmed to urge said screw to operate in a first speed regime, and
   in said second portion of said second compressor stage duty cycle said controller is programmed to operate said screw in a second, different speed regime; and
   said first portion of said duty cycle is a piston advancing portion and said second portion of said duty cycle is a piston retracting portion, and
   said process including at least one of
   a) reducing speed of said screw during said piston retracting portion of said duty cycle, and
   b) increasing speed of said screw during said piston advancing portion of said duty cycle.

10. The process of claim 9, the screw having a volute having wider pitch spacing at one end than the other, said process including progressively compressing said feedstock material with said volute as said screw turns.

11. The process of claim 9 wherein said second compressor stage includes a piston, said piston being axially reciprocable relative to said screw, and said process includes adjusting operation of said screw while said piston is in operation.

12. The process of claim 9 wherein said controller is programmed to monitor electrical motor current to said drive, and said process includes maintaining said electrical motor current below a maximum value during operation of said apparatus.

13. The process of claim 9 wherein said process includes delivering feedstock from either of said compressor stages to a de-watering section and draining liquid from said feedstock at said de-watering section.

14. The process of claim 9 wherein said process includes providing a pre-programmed schedule of operation for said second compression stage and conforming operation of said screw to said schedule.

* * * * *